(12) United States Patent
Tabata et al.

(10) Patent No.: US 8,123,643 B2
(45) Date of Patent: Feb. 28, 2012

(54) CONTROL DEVICE FOR VEHICULAR DRIVE SYSTEM

(75) Inventors: Atsushi Tabata, Okazaki (JP); Atsushi Kamada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1042 days.

(21) Appl. No.: 11/661,034

(22) PCT Filed: Jun. 22, 2006

(86) PCT No.: PCT/JP2006/012942
§ 371 (c)(1),
(2), (4) Date: Feb. 22, 2008

(87) PCT Pub. No.: WO2006/137587
PCT Pub. Date: Dec. 28, 2006

(65) Prior Publication Data
US 2008/0146408 A1    Jun. 19, 2008

(30) Foreign Application Priority Data
Jun. 24, 2005 (JP) .................................. 2005-184934

(51) Int. Cl.
*F16H 48/20* (2006.01)
(52) U.S. Cl. ...................... 475/150; 475/5; 477/3
(58) Field of Classification Search .................. 477/3–6; 457/5, 149–150
See application file for complete search history.

(56) References Cited

U.S. PATENT DOCUMENTS
6,625,524 B2   9/2003 Yamaguchi et al.
7,322,902 B2 * 1/2008 Tabata et al. ..................... 477/4

FOREIGN PATENT DOCUMENTS
DE           601 05 483 T2   10/2005
DE   10 2005 021 582 A1   12/2005

* cited by examiner

*Primary Examiner* — J. Allen Shriver, II
*Assistant Examiner* — Erez Gurari
(74) *Attorney, Agent, or Firm* — Oblon, Spivak, McClelland, Maier & Neustadt, L.L.P.

(57) ABSTRACT

A control device for a vehicular drive system including a differential portion having a differential mechanism operable to distribute an output of an engine to a first electric motor and a power transmitting member, and a second electric motor disposed in a power transmitting path between the power transmitting member and a drive wheel of a vehicle, the control device including a differential limiting device provided in the differential mechanism and operable to limit a differential function of the differential mechanism for thereby limiting a differential function of the differential portion, and a torque-response control portion for controlling a response of a change of an input torque of the differential portion to an operation of a manually operable vehicle accelerating member, depending upon whether the differential function of the differential mechanism is limited or not.

19 Claims, 15 Drawing Sheets

|  | C0 | C1 | C2 | B0 | B1 | B2 | B3 | SPEED RATIO | STEPPING RATIO |
|---|---|---|---|---|---|---|---|---|---|
| 1st | ◎ | ○ |  |  |  |  | ○ | 3.357 | 1.54 |
| 2nd | ◎ | ○ |  |  |  | ○ |  | 2.180 | 1.53 |
| 3rd | ◎ | ○ |  |  | ○ |  |  | 1.424 | 1.42 |
| 4th | ◎ | ○ | ○ |  |  |  |  | 1.000 | 1.42 |
| 5th |  | ○ | ○ | ◎ |  |  |  | 0.705 | SPREAD 4.76 |
| R |  |  | ○ |  |  | ○ |  | 3.209 |  |
| N | ○ |  |  |  |  |  |  |  |  |

○ ENGAGED
◎ ENGAGED FOR STEP-VARIABLE SHIFTING, AND RELEASED FOR CONTINUOUSLY-VARIABLE SHIFTING

|  | C0 | C1 | C2 | B0 | B1 | B2 | SPEED RATIO | STEPPING RATIO |
|---|---|---|---|---|---|---|---|---|
| 1st | ◎ | ○ |  |  |  | ○ | 2.804 | 1.54 |
| 2nd | ◎ | ○ |  |  | ○ |  | 1.531 | 1.53 |
| 3rd | ◎ | ○ | ○ |  |  |  | 1.000 | 1.42 |
| 4th |  | ○ | ○ | ◎ |  |  | 0.705 | SPREAD 3.977 |
| R |  |  | ○ |  |  | ○ | 2.393 |  |
| N | ○ |  |  |  |  |  |  |  |

○ ENGAGED
◎ ENGAGED FOR STEP-VARIABLE SHIFTING, AND RELEASED FOR CONTINUOUSLY-VARIABLE SHIFTING

CONTROL DEVICE FOR VEHICULAR DRIVE SYSTEM

TECHNICAL FIELD

The present invention relates in general to a vehicular drive system including a differential mechanism having a differential function, and electric motors, and more particularly to techniques for reducing the required size of the electric motors.

BACKGROUND ART

There is known a drive system for a vehicle, which includes a differential mechanism operable to distribute an output of an engine to a first electric motor and its output shaft, and a second electric motor disposed between the output shaft of the differential mechanism and a drive wheel of the vehicle. JP-2003-301731A discloses an example of such a vehicular drive system, which is a hybrid vehicle drive system. In this hybrid vehicle drive system, the differential mechanism is constituted by a planetary gear set, for example, and a major portion of a drive force of the engine is mechanically transmitted to the drive wheels through the differential function of the differential mechanism, while the rest of the drive force is electrically transmitted from the first electric motor to the second electric motor, through an electric path therebetween, so that the differential mechanism functions as an electrically controlled continuously variable transmission the speed ratio of which is electrically variable, thereby making it possible to drive the vehicle under the control of a control device, with the engine kept in an optimum operating state with an improved fuel economy.

Generally, a continuously variable transmission is known as a transmission which permits an improved fuel economy of the vehicle, while on the other hand a gear type transmission such as a step-variable automatic transmission is known as a transmission having a high power transmitting efficiency. However, there is not available any power transmitting mechanism having the advantages of those two types of transmission. For example, the hybrid vehicle drive system disclosed in the above-identified publication JP-2003-301731A includes the electric path for transmitting an electric energy from the first electric motor to the second electric motor, namely, a power transmitting path for transmitting a portion of the vehicle drive force as an electric energy, the first electric motor is required to be large-sized to meet a need for an increased output of the engine, and the second electric motor driven by the electric energy generated by the first electric motor is also required to be accordingly large-sized, so that the overall size of the hybrid vehicle drive system tends to be large-sized. It is also noted that a portion of the output of the engine is once converted into an electric energy which is subsequently converted into a mechanical energy to be transmitted to the drive wheels, whereby the fuel economy of the vehicle may possibly be deteriorated under some running condition of the vehicle, for instance, during a high-speed running of the vehicle. Where the above-described differential mechanism is a transmission the speed ratio of which is electrically variable, for example, a continuously variable transmission so-called an "electric CVT", the vehicular drive system suffers from a similar problem.

DISCLOSURE OF THE INVENTION

The present invention was made in view of the background art described above. It is therefore an object of the present invention to provide a control device for a vehicular drive system including a differential mechanism having a differential function for distributing an output of an engine to a first electric motor and its output shaft, and a second electric motor disposed in a power transmitting path between the differential mechanism and a drive wheel of a vehicle, which control device permits reduction of the required size of the vehicular drive system and an improvement of fuel economy of the vehicle.

The object indicated above may be achieved according to the principle of the present invention, which provides a control device for a vehicular drive system including a differential portion having a differential mechanism operable to distribute an output of an engine to a first electric motor and a power transmitting member, and a second electric motor disposed in a power transmitting path between the power transmitting member and a drive wheel of a vehicle, the control device comprising (a) a differential limiting device provided in the differential mechanism and operable to limit a differential function of the differential mechanism for thereby limiting a differential function of the differential portion, and (b) torque-response control means for controlling a response of a change of an input torque of the differential portion to an operation of a manually operable vehicle accelerating member, depending upon whether the differential function of the differential mechanism is limited or not.

According to the control device of the present invention constructed as described above, the differential portion of the vehicular drive system is placed either in a differential state in which the differential function is available, when the differential function of the differential mechanism is not limited by the differential limiting device, or in a non-differential state in which the differential function is limited, when the differential function of the differential mechanism is limited by the differential limiting device. Namely, the differential portion can be placed in the non-differential state or locked state with its differential mechanism being placed in its non-differential or locked state in which the differential function is limited. Accordingly, the vehicular drive system controlled by the present control device has both an advantage of an improved fuel economy of a transmission the speed ratio of which is electrically controllable, and an advantage of a high power transmitting efficiency of a gear type power transmitting device capable of mechanically transmitting power from the engine to the drive wheel.

For instance, the fuel economy of the vehicle is improved when the differential portion is placed in its differential state during a low-to-medium speed running or low-to-medium output running of the vehicle with the engine placed in a normal output state. The fuel economy is also improved when the differential portion is placed in its non-differential state during a high-speed running of the vehicle, since the output of the engine is primarily transmitted through a mechanical power transmitting path to the drive wheels, with reduction of a loss of conversion between mechanical and electric energies, which would take place in the transmission the speed ratio of which is electrically variable. When the differential portion is placed in the non-differential state during a high-output running of the vehicle, on the other hand, the vehicular drive system operates as the transmission the speed ratio of which is electrically variable, only at the low to medium running speed of the vehicle, so that the maximum electric energy that should be generated by the first electric motor can be reduced, thereby making it possible to minimize the required sizes or capacities of the first electric motor, and the second electric motor operated by the electric energy generated by the first electric motor, and the required size of the vehicular drive system including these two electric motors.

The control device of the present invention for the vehicular drive system provided with the differential portion the differential function of which can be limited is further arranged such that the torque-response control means controls the response of a change of the input torque of the differential portion to an operation of the vehicle accelerating member, depending upon whether the differential function of the differential mechanism is limited or not. Accordingly, the present control device reduces the amount of change of the input torque of the differential portion placed in its non-differential state (locked state), so that the amount of change of the drive torque to be transmitted to the drive wheels in the non-differential state of the differential portion is reduced, whereby the shock of the vehicular drive system to be caused by the operation of the vehicle accelerating member can be reduced.

The differential portion is preferably a continuously-variable transmission portion operable as an electrically controlled continuously variable transmission.

In a first preferred form of the present invention, the torque-response control means is operable to control the response of the change of the input torque of the differential portion to the operation of the manually operable vehicle accelerating member, such that the response is higher when the differential function of the differential mechanism is not limited, than when the differential function of the differential mechanism is limited. In the differential state of the differential portion in which the differential function is not limited, the amount of change of the engine torque due to the operation of the vehicle accelerating member is reduced or absorbed by the differential function of the differential portion, and the shock of the vehicular drive system to be caused by the operation of the vehicle accelerating member is smaller than in the non-differential state in which the differential function is limited. Accordingly, the torque-response control means arranged to assure a higher response of the change of the input torque of the differential portion placed in the differential state permits a comparatively high rate of change of the drive torque to be transmitted to the drive wheels, according to the operation of the vehicle accelerating member, while the differential function of the differential portion is not limited. In the non-differential state of the differential portion in which the differential function is limited, the change of the input torque of the differential portion is transmitted directly to the drive wheel, and the shock of the vehicular drive system to be caused by the operation of the vehicle accelerating member is larger than in the differential state in which the differential function is not limited. Accordingly, the torque-response control means is arranged to permit a lower response of the change of the input torque of the differential portion placed in the non-differential state, causing a comparatively low rate of change of the drive torque to be transmitted to the drive wheel, so that the shock of the vehicular drive system to be caused by the operation of the vehicle accelerating member in the non-differential state of the differential portion is reduced.

In a second preferred form of this invention, the torque-response control means is operable to reduce a response of a change of a torque of the engine to the operation of the manually operable vehicle accelerating member, for thereby reducing the response of the change of the input torque of the differential portion. In this form of the invention, the response of the change of the engine torque to the operation of the vehicle accelerating member is changed depending upon whether the differential function of the differential mechanism is limited or not, so that the response of the change of the input torque of the differential portion is changed depending upon whether the differential function of the differential mechanism is limited or not.

In a third preferred form of this invention, the torque-response control means is operable to control at least one of the first electric motor and the second electric motor to generate a drive torque to be added to or subtracted from a torque of the engine, for thereby reducing the response of the change of the input torque of the differential portion. In this form of the invention, the amount of change of the engine torque due to the operation of the vehicle accelerating member is reduced by the drive torque generated by at least one of the first and second electric motors, depending upon the differential function of the differential mechanism is limited or not, so that the response of the change of the input torque of the differential portion to the operation of the vehicle accelerating member is changed depending upon whether the differential function of the differential mechanism is limited or not.

In a fourth preferred form of this invention, the differential limiting device is operable to place said differential mechanism in a differential state in which the differential function is available, for thereby placing differential portion in a differential state in which the differential function is available, and to place the differential mechanism in a non-differential state in which the differential function is not available and is limited, for thereby placing the differential portion in a non-differential state (locked state) in which the differential function is not available and is limited. Thus, the differential portion is switchable by the differential limiting device, between the differential and non-differential states (non-locked and locked states).

Where the differential portion is a continuously-variable transmission portion operable as an electrically controlled continuously variable transmission, the differential limiting device is operable to place the differential mechanism in a differential state in which the differential function is available, for thereby placing the continuously-variable transmission portion in a continuously-variable shifting state in which the continuously-variable transmission portion is operable as the electrically controlled continuously variable transmission, and to place the differential mechanism in a non-differential state (locked state) in which the differential function is not available and is limited, for thereby placing the continuously-variable transmission portion in a step-variable shifting state in which the function of the continuously-variable transmission portion as the electrically controlled continuously variable transmission is limited. Thus, the continuously-variable transmission portion is switchable by the differential limiting device, between the continuously-variable and step-variable shifting states.

In a fifth preferred form of this invention, the differential mechanism has a first element connected to the engine, a second element connected to the first electric motor and a third element connected to the power transmitting member, and the differential limiting device is operable to place the differential mechanism in a differential state in which the first, second and third elements of the differential mechanism are rotatable relative to each other, and to place the differential mechanism in a non-differential state (locked state) in which at least the second and third elements are not rotatable relative to each other. For example, the second and third elements are rotatable at respective different speeds in the differential state of the differential mechanism, and the first, second and third elements are rotated as a unit or the second element is held stationary in the non-differential or locked state of the differential mechanism. Thus, the differential mechanism is switchable between the differential and non-differential states.

In one advantageous arrangement of the fifth preferred form of this invention, the differential limiting device includes a clutch operable to connect any two of the first, second and third elements of the differential mechanism to each other for rotating the first, second and third elements as a unit, and/or a brake operable to fix the second element to a stationary member for holding the second element stationary. This arrangement permits the differential mechanism to be easily switched between the differential and non-differential states.

Preferably, the differential limiting device includes both of the clutch and brake described above, and the clutch and brake are released to place the differential mechanism in the differential state in which at least the second and third elements are rotatable at respective different speeds, and in which the differential mechanism is operable as an electrically controlled differential device. In this case, the clutch is engaged to permit the differential mechanism to be operable as a transmission having a speed ratio of 1, or the brake is engaged to permit the differential mechanism to be operable as a speed-increasing transmission having a speed ratio lower than 1. In this arrangement, the differential mechanism is switchable between the differential state and the non-differential state, and is operable as a transmission having a single gear position with a single fixed speed ratio or a plurality of gear positions having respective fixed speed ratios.

In another advantageous arrangement of the fifth preferred form of the invention described above, the differential mechanism is a planetary gear set, and the first element is a carrier of the planetary gear set, and the second element is a sun gear of the planetary gear set, while said third element is a ring gear of the planetary gear set. In this arrangement, the axial dimension of the differential mechanism can be reduced, and is simply constituted by one planetary gear device.

Preferably, the planetary gear set is of a single-pinion type. In this case, the axial dimension of the differential mechanism can be reduced, and the differential mechanism is simply constituted by one planetary gear set.

In a sixth preferred form of this invention, the vehicular drive system further includes a transmission portion disposed in the power transmitting path, and an overall speed ratio of the vehicular drive system is defined by a speed ratio of the differential portion and a speed ratio of the transmission portion. In this form of the invention, the vehicle drive force can be obtained over a relatively wide range of the overall speed ratio, by utilizing the speed ratio of the transmission portion, so that the efficiency of the electric continuously-variable shifting control of the differential portion is further improved. When the transmission portion is placed in a gear position the speed ratio of which is higher than 1, and functions as a speed-reducing device, the required output torque of the second electric motor may be smaller than the torque of an output shaft of the vehicular drive system, so that the required size of the second electric motor can be reduced.

In an advantageous arrangement of the sixth preferred form of the invention, the transmission portion is a step-variable automatic transmission portion. In this arrangement, the differential portion placed in its differential state and the step-variable automatic transmission cooperate to constitute a continuously-variable transmission the drive torque of which is smoothly variable. Further, the differential portion placed in its non-differential or locked state and the step-variable automatic transmission portion cooperate to constitute a step-variable transmission the speed ratio of which is rapidly variable in steps.

Preferably, the control device is arranged to place the vehicular drive system in a non-continuously-variable shifting state, for example, in a step-variable shifting state, when the vehicle is running at a relatively high speed, and in a continuously-variable shifting state when the vehicle is running at a low or medium running speed. In this case, the vehicular drive system operates as a step-variable transmission in the step-variable shifting state, and as an electrically controlled continuously-variable transmission in the continuously-variable shifting state. This arrangement assures improved fuel economy of the vehicle not only in the continuously-variable shifting state during the low- or medium-speed running of the vehicle, but also in the step-variable shifting state during the high-speed running of the vehicle. In the step-variable shifting state, the output of the engine is transmitted to the drive wheel primarily through a mechanical power transmitting path, so that the fuel economy is improved owing to reduction of a loss of energy conversion between mechanical and electric energies, which would take place when the vehicular drive system operates as the electrically controlled continuously-variable transmission.

A manually operable means may be provided to selectively place the vehicular drive system in one of a non-continuously-variable shifting state (step-variable shifting state) and a continuously-variable shifting state, so that the vehicle operator can manually place the vehicular drive system in the continuously-variable shifting state when the vehicle operator desires the vehicular drive system to operate as a continuously variable transmission or desires to improve the fuel economy of the vehicle, or place the vehicle drive system in the step-variable shifting state when the vehicle operator desires the vehicular drive system to operate as a step-variable transmission or desires a rhythmic change of the engine speed as a result of a shifting action of the step-variable transmission.

BRIEF DESCRIPTION OF THE DRAWINGS

The above and other objects, features, advantages and industrial and technical significance of the present invention will be better understood by reading the following detailed description of preferred embodiments of the invention, when considered in connection with the drawings, in which:

FIG. 10A is a view indicating an example of a relationship between a rate of change of an operating amount of an accelerator pedal and an smoothing amount of an input torque of a differential portion of the hybrid vehicle drive system when the accelerator pedal is depressed to accelerate the vehicle, while

BEST MODE FOR CARRYING OUT THE INVENTION

Embodiment 1

Figures 1, 2:
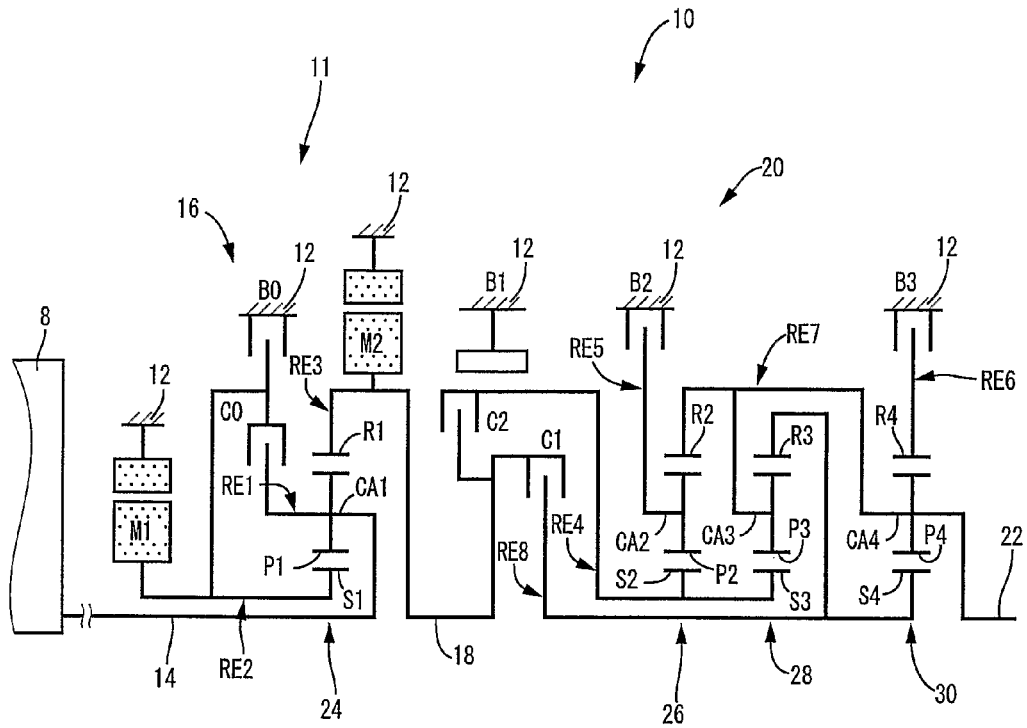
FIG. 1 is a schematic view showing an arrangement of a drive system of a hybrid vehicle to which the present invention is applicable.
FIG. 2 is a table indicating shifting actions of the hybrid vehicle drive system of FIG. 1, which is operable in a selected one of a continuously-variable shifting state and a step-variable shifting state, in relation to different combinations of operating states of hydraulically operated frictional coupling devices to effect the respective shifting actions.

Referring to the drawings, there will be described in detail the preferred embodiments of the present invention.

Figure 5:
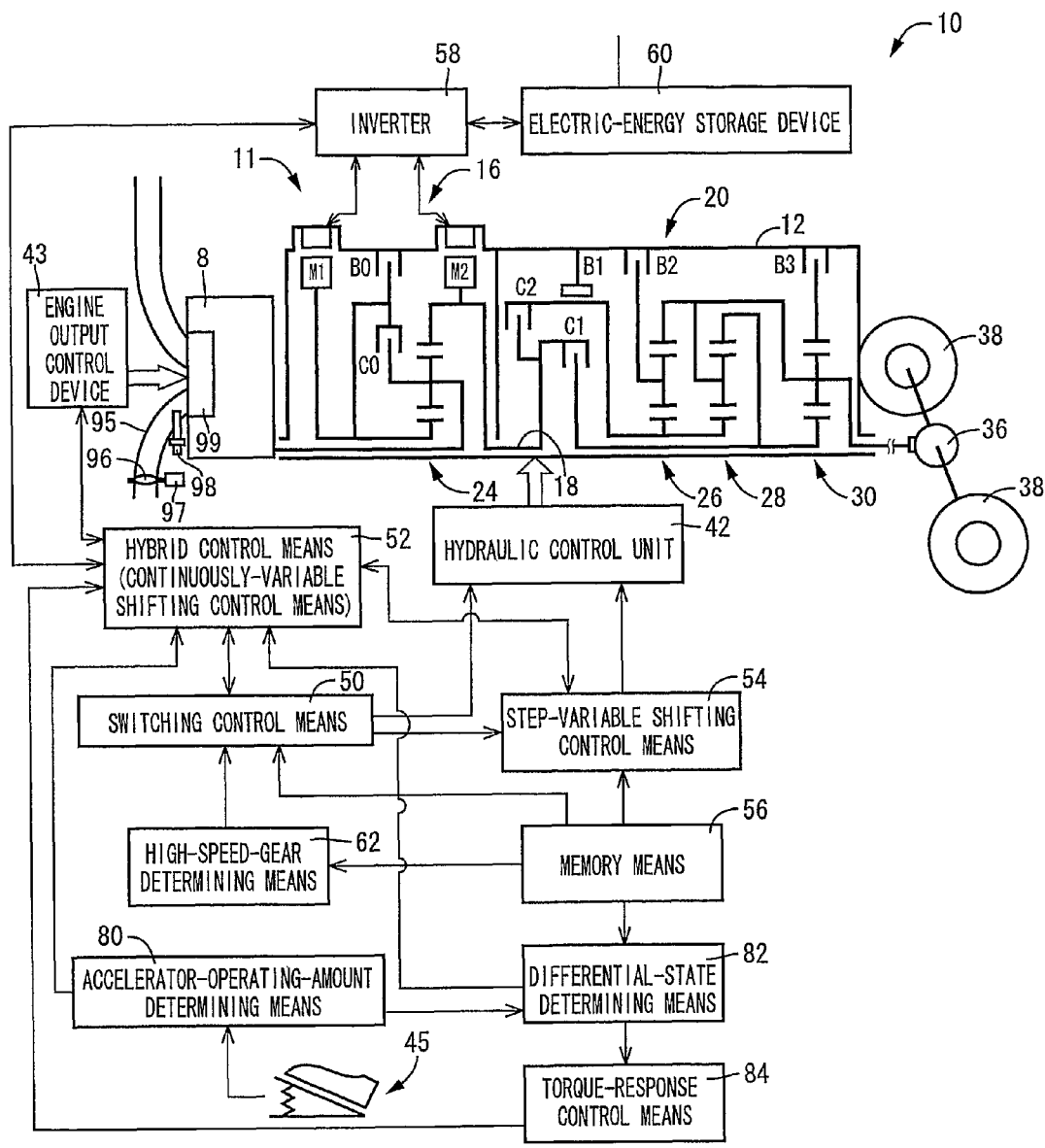
FIG. 5 is a functional block diagram illustrating major control functions of the electronic control device of FIG. 4.

Referring to the schematic view of FIG. 1, there is shown a transmission mechanism 10 constituting a part of a drive system for a hybrid vehicle, which drive system is controlled by a control device according to one embodiment of this invention. In FIG. 1, the transmission mechanism 10 includes: an input rotary member in the form of an input shaft 14; a continuously-variable transmission portion in the form of a differential portion 11 connected to the input shaft 14 either directly, or indirectly via a pulsation absorbing damper (vibration damping device) not shown; a step-variable or multiple-step transmission portion in the form of an automatic transmission portion 20 disposed between the differential portion 11 and drive wheels 38 (shown in FIG. 5) of the vehicle, and connected in series via a power transmitting member 18 (power transmitting shaft) to the transmission portion 11 and the drive wheels 38; and an output rotary member in the form of an output shaft 22 connected to the automatic transmission portion 20. The input shaft 14, differential portion 11, automatic transmission portion 20 and output shaft 22 are coaxially disposed on a common axis in a transmission casing 12 functioning as a stationary member attached to a body of the vehicle, and are connected in series with each other. This transmission mechanism 10 is suitably used for a transverse FR vehicle (front-engine, rear-drive vehicle), and is disposed between a drive power source in the form of an internal combustion engine 8 and the pair of drive wheels 38, to transmit a vehicle drive force from the engine 8 to the pair of drive wheels 38 through a differential gear device 36 (final speed reduction gear) and a pair of drive axles, as shown in FIG. 5. The engine 8 may be a gasoline engine or diesel engine and functions as a vehicle drive power source directly connected to the input shaft 14 or indirectly via a pulsation absorbing damper.

This is also true in the other embodiments described below. In the present transmission mechanism 10, the engine 8 and the differential portion 11 are directly connected to each other. This direct connection means that the engine 8 and the differential portion 11 are connected to each other, without a fluid-operated power transmitting device such as a torque converter or a fluid coupling being disposed therebetween, but may be connected to each other through the pulsation absorbing damper as described above. It is noted that a lower half of the transmission mechanism 10, which is constructed symmetrically with respect to its axis, is omitted in FIG. 1.

The differential portion 11 includes: a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 the output shaft of which is rotated with the power transmitting member 18. The second electric motor M2 may be disposed at any portion of the power transmitting path between the power transmitting member 18 and the drive wheels 38. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16 includes, as major components, a first planetary gear set 24 of a single pinion type having a gear ratio $\rho1$ of about 0.418, for example, a switching clutch C0 and a switching brake B0. The first planetary gear set 24 has rotary elements consisting of: a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio $\rho1$ is represented by ZS1/ZR1.

In the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The switching brake B0 is disposed between the first sun gear S1 and the transmission casing 12, and the switching clutch C0 is disposed between the first sun gear S1 and the first carrier CA1. When the switching clutch C0 and brake B0 are both released, the power distributing mechanism 16 is placed in a differential state in which three elements of the first planetary gear set 24 consisting of the first sun gear S1, first carrier CA1 and first ring gear R1 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the power distributing mechanism 16 is placed in the continuously-variable shifting state (electrically established CVT state), in which the rotating speed of the power transmitting member 18 is continuously variable, irrespective of the rotating speed of the engine 8, namely, placed in the differential state in which a speed ratio $\gamma0$ (rotating speed of the input shaft 14/rotating speed of the power transmitting member 18) of the power distributing mechanism 16 is continuously changed from a minimum value $\gamma0min$ to a maximum value $\gamma0max$, that is, in the continuously-variable shifting state in which the power distributing mechanism 16 functions as an electrically controlled continuously variable transmission the speed ratio $\gamma0$ of which is continuously variable from the minimum value $\gamma0min$ to the maximum value $\gamma0max$.

When the switching clutch C0 or brake B0 is engaged while the power distributing mechanism 16 is placed in the continuously-variable shifting state, the power distributing mechanism 16 is brought into a locked state or non-differential state in which the differential function is not available. Described in detail, when the switching clutch C0 is engaged, the first sun gear S1 and the first carrier CA1 are connected together, so that the power distributing mechanism 16 is placed in the locked state in which the three rotary elements of the first planetary gear set 24 consisting of the first sun gear S1, first carrier CA1 and first ring gear R1 are rotatable as a unit, namely, placed in a first non-differential state in which the differential function is not available, so that the differential portion 11 is also placed in a non-differential state. In this non-differential state, the rotating speed of the engine 8 and the rotating speed of the power transmitting member 18 are made equal to each other, so that the differential portion 11 (power distributing mechanism 16) is placed in a fixed-speed-ratio shifting state or step-variable shifting state in which the mechanism 16 functions as a transmission having a fixed speed ratio $\gamma0$ equal to 1.

When the switching brake B0 is engaged in place of the switching clutch C0, the first sun gear S1 is fixed to the transmission casing 12, so that the power distributing mechanism 16 is placed in the locked state in which the first sun gear S1 is not rotatable, namely, placed in a second non-differential state in which the differential function is not available, so that the differential portion 11 is also placed in the non-differential state. Since the rotating speed of the first ring gear R1 is made higher than that of the first carrier CA1, the differential portion 11 is placed in the fixed-speed-ratio shifting state or step-variable shifting state in which differential portion 11 (the power distributing mechanism 16) functions as a speed-increasing transmission having a fixed speed ratio $\gamma0$ smaller than 1, for example, about 0.7.

Thus, the frictional coupling devices in the form of the switching clutch C0 and brake B0 function as a differential-state switching device operable to selectively switch the differential portion 11 (power distributing mechanism 16) between the differential state (namely, non-locked state) and the non-differential state (namely, locked state), that is, between the continuously-variable shifting state in which the differential portion 11 (the power distributing mechanism 16) is operable as an electrically controlled continuously variable transmission the speed ratio of which is continuously variable, and the locked state in which the differential portion 11 is not operable as the electrically controlled continuously variable transmission capable of performing a continuously-variable shifting operation, and in which the speed ratio of the transmission portion 11 is held fixed, namely, the fixed-speed-ratio shifting state (non-differential state) in which the transmission portion 11 is operable as a transmission having a single gear position with one speed ratio or a plurality of gear positions with respective speed ratios.

In other words, the switching clutch C0 and switching brake B0 function as a differential limiting device operable to limit the differential function of the power distributing mechanism 16 for limiting the electric differential function of the differential portion 11, namely, the function of the differential portion 11 as the electrically controlled continuously variable transmission, by placing the power distributing mechanism 16 in its non-differential state to place the differential portion 11 in its step-variable shifting state. The switching clutch C0 and switching brake B0 are also operable to place the power distributing mechanism 16 in its differential state, for placing the differential portion 11 in its continuously-variable shifting state, in which the differential function of the power distributing mechanism 16 and the electric differential function of the differential portion 11 are not limited, namely, the function of the differential portion as the electrically controlled continuously variable transmission is not limited.

The automatic transmission portion 20 includes a single-pinion type second planetary gear set 26, a single-pinion type third planetary gear set 28 and a single-pinion type fourth planetary gear set 30. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio ρ2 of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio ρ3 of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio ρ4 of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios ρ2, ρ3 and ρp4 are represented by ZS2/ZR2. ZS3/ZR3, and ZS4/ZR4, respectively.

In the automatic transmission portion 20, the second sun gear S2 and the third sun gear S3 are integrally fixed to each other as a unit, selectively connected to the power transmitting member 18 through a second clutch C2, and selectively fixed to the transmission casing 12 through a first brake B1. The second carrier CA2 is selectively fixed to the transmission casing 12 through a second brake B2, and the fourth ring gear R4 is selectively fixed to the transmission casing 12 through a third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1. Thus, the automatic transmission portion 20 and the power transmitting member 18 are selectively connected to each other through the first clutch C1 or the second clutch C2, which is provided to shift the automatic transmission portion 20. In other words, the first clutch C1 and the second clutch C2 function as a coupling device operable to place a power transmitting path between the power transmitting member 18 and the automatic transmission portion 20, that is, between the differential portion 11 (power transmitting member 18) and the drive wheels 38, selectively in one of a power transmitting state in which a vehicle drive force can be transmitted through the power transmitting path, and a power cut-off state in which the vehicle drive force cannot be transmitted through the power transmitting path. Described more specifically, the above-indicated power transmitting path is placed in the power transmitting state when at least one of the first clutch C1 and the second clutch C2 is placed in the engaged state, and is placed in the power cut-off state when the first clutch C1 and the second clutch C2 are placed in the released state. The automatic transmission portion 20 is a step-variable transmission which is operable to perform so-called "clutch-to-clutch shifting actions" each of which is effected by concurrent engaging and releasing actions of the appropriate two frictional coupling devices.

The above-described switching clutch C0, first clutch C1, second clutch C2, switching brake B0, first brake B1, second brake B2 and third brake B3 are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

In the transmission mechanism 10 constructed as described above, the power distributing mechanism 16 is provided with the switching clutch C0 and the switching brake B0 one of which is engaged to place the differential portion 11 in the continuously-variable shifting state in which the differential portion 11 is operable as a continuously variable transmission, or in the step-variable shifting state (fixed-speed-ratio shifting state) in which the differential portion 11 is operable as a step-variable transmission having a fixed speed ratio or ratios. In the present transmission mechanism 10, therefore, the differential portion 11 placed in the fixed-speed-ratio shifting state by the engaging action of one of the switching clutch C0 and switching brake B0 cooperates with the automatic transmission portion 20 to constitute a step-variable transmission device, while the differential portion 11 placed in the continuously-variable shifting state with the switching clutch C0 and switching brake B0 being both held in the released state cooperates with the automatic transmission portion 20 to constitute an electrically controlled continuously variable transmission device. In other words, the transmission mechanism 10 is placed in its step-variable shifting state by engaging one of the switching clutch C0 and switching brake B0, and in its continuously-variable shifting state by releasing both of the switching clutch C0 and switching brake B0. Similarly, the differential portion 11 is selectively placed in one of its step-variable and continuously-variable shifting states.

When the transmission mechanism 10 is placed in its step-variable shifting state with the differential portion 11 placed in its step-variable shifting state with one of the switching clutch C0 and switching brake B0 held in the engaged state, one of a first gear position (first speed position) through a fifth gear position (fifth speed position), a reverse gear position (rear drive position) and a neutral position is selectively established by engaging actions of a corresponding combination of the two frictional coupling devices selected from the above-described first clutch C1, second clutch C2, first brake B1, second brake B2 and third brake B3, as indicated in the table of FIG. 2. The two frictional coupling devices may consist of a frictional coupling device to be released, and a frictional coupling device to be engaged. The above-indicated positions have respective speed ratios γT (input shaft speed $N_{IN}$/output shaft speed $N_{OUT}$) which change as geometric series. The speed ratios γT are overall speed ratios of the transmission mechanism 10 determined by a speed ratio γ0 of the differential portion 11 and a speed ratio γ of the automatic transmission portion 20.

Where the transmission mechanism 10 functions as the step-variable transmission, for example, the first gear position having the highest speed ratio γ1 of about 3.357, for example, is established by engaging actions of the switching clutch C0, first clutch C1 and third brake B3, and the second gear position having the speed ratio γ2 of about 2.180, for example, which is lower than the speed ratio γ1, is established by engaging actions of the switching clutch C0', first clutch C1 and second brake B2, as indicated in FIG. 2. Further, the third gear position having the speed ratio γ3 of about 1.424, for example, which is lower than the speed ratio γ2, is established by engaging actions of the switching clutch C0, first clutch C1 and first brake B1, and the fourth gear position having the speed ratio γ4 of about 1.000, for example, which is lower than the speed ratio γ3, is established by engaging actions of the switching clutch C0, first clutch C1 and second clutch C2. The fifth gear position having the speed ratio γ5 of about 0.705, for example, which is smaller than the speed ratio γ4, is established by engaging actions of the first clutch C1, second clutch C2 and switching brake B0. Further, the reverse gear position having the speed ratio γR of about 3.209, for example, which is intermediate between the speed ratios γ1 and γ2, is established by engaging actions of the second clutch C2 and the third brake B3. The neutral position N is established by engaging only the switching clutch C0.

Where the transmission mechanism 10 functions as the continuously-variable transmission with the differential portion 11 placed in its continuously-variable shifting state, on the other hand, the switching clutch C0 and the switching brake B0 indicated in FIG. 2 are both released, so that the differential portion 11 functions as the continuously variable transmission, while the automatic transmission portion 20 connected in series to the differential portion 11 functions as the step-variable transmission, whereby the speed of the rotary motion transmitted to the automatic transmission portion 20 placed in a selected gear position M, namely, the rotating speed of the power transmitting member 18 is continuously changed, so that the speed ratio of the drive system when the automatic transmission portion 20 is placed in the selected gear position M is continuously variable over a predetermined range. Accordingly, the overall speed ratio γT of the transmission mechanism 10 determined by the speed ratio γ0 of the differential portion 11 and the speed ratio γ of the automatic transmission portion 20 is continuously variable.

For example, the input speed $N_{IN}$ of the automatic transmission portion 20 placed in one of the first through fourth gear positions (or the fifth gear position established by the engaging actions of the same frictional coupling devices C1, C2 as used to establish the fourth gear position) is continuously variable in the released state of both of the switching clutch C0 and switching brake B0, as indicated in the table of FIG. 2, while the transmission mechanism 10 functions as the continuously variable transmission, so that the overall speed ratio γT of the transmission mechanism 10 is continuously variable across the adjacent gear positions.

Figure 3:
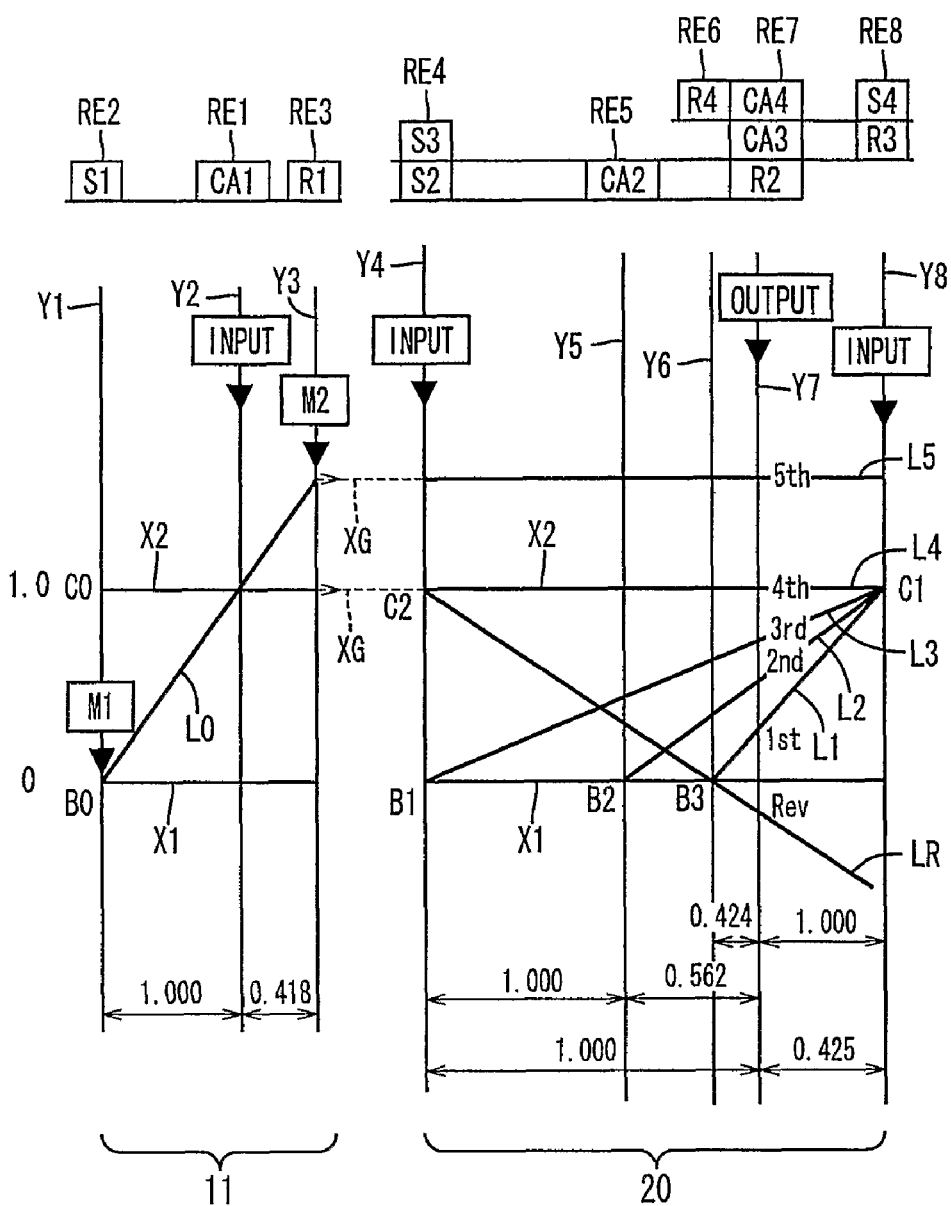
FIG. 3 is a collinear chart indicating relative rotating speeds of the hybrid vehicle drive system of FIG. 1 operated in the step-variable shifting state, in different gear positions of the drive system.

The collinear chart of FIG. 3 indicates, by straight lines, a relationship among the rotating speeds of the rotary elements in each of the gear positions of the transmission mechanism 10, which is constituted by the differential portion 11 functioning as the continuously-variable shifting portion or first shifting portion, and the automatic transmission portion 20 functioning as the step-variable shifting portion (automatic transmission portion) or second shifting portion. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. A lower one of three horizontal lines, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 16 of the differential portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines are determined by the gear ratios ρ2, ρ3 and ρ4 of the second, third and fourth planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio ρ. In the differential portion 11, the distance between the vertical lines Y1 and Y2 corresponds to "1", while the distance between the vertical lines Y2 and Y3 corresponds to the gear ratio ρ. In the automatic transmission portion 20, the distance between the sun gear and carrier of each of the second, third and fourth planetary gear sets 26, 28, 30 corresponds to "1", while the distance between the carrier and ring gear of each planetary gear set 26, 28, 30 corresponds to the gear ratio ρ.

Referring to the collinear chart of FIG. 3, the power distributing mechanism 16 (differential portion 11) of the transmission mechanism 10 is arranged such that the first rotary element RE1 (first carrier CA1) of the first planetary gear set 24 is integrally fixed to the input shaft 14 (engine 8) and selectively connected to the second rotary element RE2 (first sun gear S1) through the switching clutch C0, and this second rotary element RE2 is fixed to the first electric motor M1 and selectively fixed to the casing 12 through the switching brake B0, while the third rotary element RE3 (first ring gear R1) is fixed to the power transmitting member 18 and the second electric motor M2, so that a rotary motion of the input shaft 14 is transmitted (input) to the automatic transmission portion 20 through the power transmitting member 18. A relationship between the rotating speeds of the first sun gear S1 and the first ring gear R1 is represented by an inclined straight line L0 which passes a point of intersection between the lines Y2 and X2.

When the transmission mechanism 10 is brought into the continuously-variable shifting state (differential state) by releasing actions of the switching clutch C0 and brake B0, for instance, the first through third rotary elements RE1-RE3 are rotatable relative to each other, for example, at least the second rotary element RE2 and the third rotary element RE3 are rotatable relative to each other. In this case, the rotating speed of the first sun gear S1 represented by a point of intersection between the straight line L0 and the vertical line Y1 is raised or lowered by controlling the operating speed of the first electric motor M1, so that the rotating speed of the first carrier CA1 represented by the straight line L0 and the vertical line Y2, that is, the engine speed $N_E$ is raised or lowered, if the rotating speed of the first ring gear R1 determined by the vehicle speed V and represented by a point of intersection between the straight line L0 and the vertical line Y3 is substantially held constant.

When the switching clutch C0 is engaged, the first sun gear S1 and the first carrier CA1 are connected to each other, and the power distributing mechanism 16 is placed in the first non-differential state in which the above-indicated three rotary elements RE1, RE2, RE3 are rotated as a unit and the relative rotation of the second and third rotary elements RE2, RE3 is prevented, so that the straight line L0 is aligned with the horizontal line X2, so that the power transmitting member 18 is rotated at a speed equal to the engine speed $N_E$. When the switching brake B0 is engaged, on the other hand, the first sun gear S1 is fixed to the transmission casing 12, and the power distributing mechanism 16 is placed in the second non-differential state in which the second rotary element RE2 is stopped and the relative rotation of the second and third rotary elements RE2, RE3 is prevented, so that the straight line L0 is inclined in the state indicated in FIG. 3, whereby the differential portion 11 functions as a speed increasing mechanism. Accordingly, the rotating speed of the first ring gear R1 represented by a point of intersection between the straight lines L0 and Y3, that is, the rotating speed of the power transmitting member 18 is made higher than the engine speed $N_E$ and transmitted to the automatic transmission portion 20.

In the automatic transmission portion 20, the fourth rotary element RE4 is selectively connected to the power transmitting member 18 through the second clutch C2, and selectively fixed to the transmission casing 12 through the first brake B1, and the fifth rotary element RE5 is selectively fixed to the transmission casing 12 through the second brake B2, while the sixth rotary element RE6 is selectively fixed to the transmission casing 12 through the third brake B3. The seventh rotary element RE7 is fixed to the output shaft 22, while the eighth rotary element RE8 is selectively connected to the power transmitting member 18 through the first clutch C1.

When the first clutch C1 and the third brake B3 are engaged, the automatic transmission portion 20 is placed in the first gear position. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22. In the first through fourth gear positions in which the switching clutch C0 is placed in the engaged state, the eighth rotary element RE8 is rotated at the same speed as the engine speed $N_E$, with the drive force received from the differential portion 11, that is, from the power distributing mechanism 16. When the switching brake B0 is engaged in place of the switching clutch C0, the eighth rotary element RE8 is rotated at a speed higher than the engine speed $N_E$, with the drive force received from the power distributing mechanism 16. The rotating speed of the output shaft 22 in the fifth gear position established by the engaging actions of the first clutch C1, second clutch C2 and switching brake B0 is represented by a point of intersection between a horizontal line L5 determined by those engaging actions and the vertical line Y7 indicative of the rotating speed of the seventh rotary element RE7 fixed to the output shaft 22.

Figure 4:
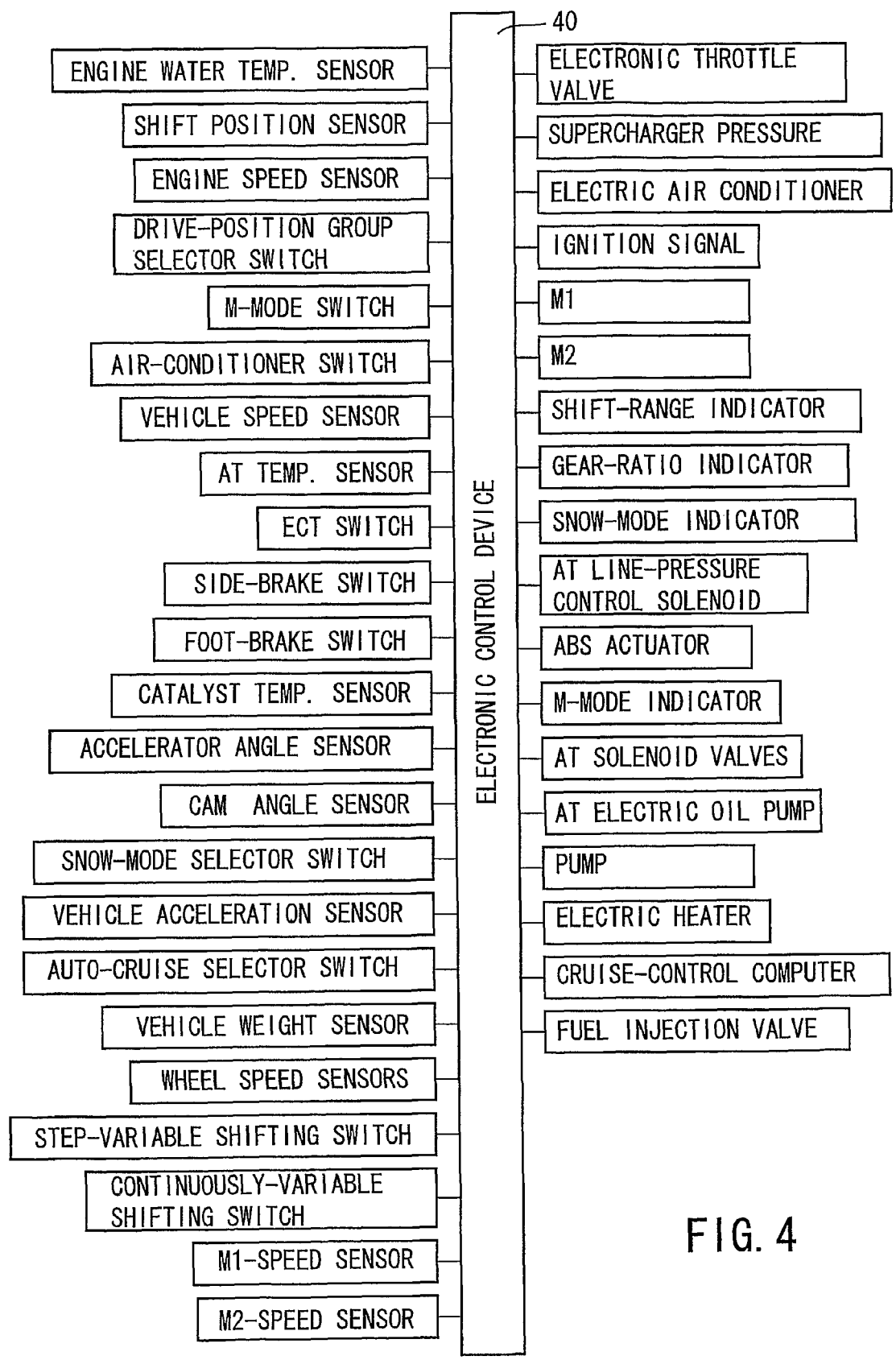
FIG. 4 is a view indicating input and output signals of an electronic control device according to one embodiment of this invention to control the drive system of FIG. 1.

FIG. 4 illustrates signals received by an electronic control device 40 provided to control the transmission mechanism 10, and signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the RAM, to implement hybrid drive controls of the engine 8 and electric motors M1 and M2, and drive controls such as shifting controls of the transmission portion 20.

The electronic control device 40 is arranged to receive, from various sensors and switches shown in FIG. 4, various signals such as: a signal indicative of a temperature $TEMP_W$ of cooling water of the engine 8; a signal indicative of a selected operating position $P_{SH}$ of a shift lever; a signal indicative of the operating speed $N_E$ of the engine 8; a signal indicative of a value indicating a selected group of forward-drive positions of the transmission mechanism 10; a signal indicative of an M mode (motor drive mode); a signal indicative of an operated state of an air conditioner; a signal indicative of a vehicle speed V corresponding to the rotating speed $N_{OUT}$ of the output shaft 22; a signal indicative of a temperature of a working oil of the automatic transmission portion 20; a signal indicative of an operated state of a side brake; a signal indicative of an operated state of a foot brake; a signal indicative of a temperature of a catalyst; a signal indicative of an amount of operation (an angle of operation) $A_{CC}$ of a manually operable vehicle accelerating member in the form of an accelerator pedal 45 (shown in FIG. 5); a signal indicative of an angle of a cam; a signal indicative of the selection of a snow drive mode; a signal indicative of a longitudinal acceleration value G of the vehicle; a signal indicative of the selection of an auto-cruising drive mode; a signal indicative of a weight of the vehicle; signals indicative of speeds of the drive wheels of the vehicle; a signal indicative of an operating state of a step-variable shifting switch provided to place the differential portion 11 (power distributing mechanism 16) in the step-variable shifting state (locked state) in which the transmission mechanism 10 functions as a step-variable transmission; a signal indicative of a continuously-variable shifting switch provided to place the differential portion 11 in the continuously variable-shifting state (differential state) in which the transmission mechanism 10 functions as the continuously variable transmission; a signal indicative of a rotating speed $N_{M1}$ of the first electric motor M1 (hereinafter referred to as "first electric motor speed $N_{M1}$); a signal indicative of a rotating speed $N_{M2}$ of the second electric motor M2 (hereinafter referred to as "second electric motor speed $N_{M2}$); and a signal indicative of an amount of electric energy SOC stored in (a charging state of) an electric-energy storage device 60 (shown in FIG. 5).

The electronic control device 40 is further arranged to generate various signals such as: control signals to be applied to an engine output control device 43 (shown in FIG. 5) to control the output of the engine 8, such as a drive signal to drive a throttle actuator 97 for controlling an angle of opening $\theta_{TH}$ of an electronic throttle valve 96 disposed in a suction pipe 95 of the engine 8, a signal to control an amount of injection of a fuel by a fuel injecting device 98 into the suction pipe 95 or cylinders of the engine 8, a signal to be applied to an ignition device 99 to control the ignition timing of the engine 8, and a signal to adjust a supercharger pressure of the engine 8; a signal to operate the electric air conditioner; signals to operate the electric motors M1 and M2; a signal to operate a shift-range indicator for indicating the selected operating or shift position of the shift lever; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves incorporated in a hydraulic control unit 42 (shown in FIG. 5) provided to control the hydraulic actuators of the hydraulically operated frictional coupling devices of the differential portion 11 and automatic transmission portion 20; a signal to operate an electric oil pump used as a hydraulic pressure source for the hydraulic control unit 42; a signal to drive an electric heater; and a signal to be applied to a cruise-control computer.

FIG. 5 is a functional block diagram of FIG. 5 for explaining major control functions of the electronic control device 40, which includes switching control means 50, hybrid control means (continuously-variable shifting control means) 52, step-variable shifting control means 54, memory means 56, high-speed-gear determining means 62, accelerator-operating-amount determining means 80, differential-state determining means 82, and torque-response control means 84. The step-variable shifting control means 54 is arranged to determine whether a shifting action of the automatic transmission portion 20 should take place, that is, to determine the gear position to which the automatic transmission portion 20 should be shifted. This determination is made on the basis of a condition of the vehicle in the form of the vehicle speed V and an output torque $T_{OUT}$ of the automatic transmission portion 20, and according to a shifting boundary line map (shifting control map or relation) which is stored in the memory means 56 and which represents shift-up boundary lines indicated by solid lines in FIG. 6 and shift-down boundary lines indicated by one-dot chain lines in FIG. 6. The step-variable shifting control means 54 generates shifting commands to be applied to the hydraulic control unit 42, to selectively engage and release the respectively two hydraulically operated frictional coupling devices (except the switching clutch C0 and brake B0), for establishing the determined gear position of the automatic transmission portion 20 according to the table of FIG. 2. Described in detail, the step-variable shifting control means 54 commands the hydraulic control unit 42 to control the solenoid-operated valves incorporated in the hydraulic control unit 42, for activating the appropriate hydraulic actuators to concurrently engage one of the two frictional coupling device and release the other frictional coupling device, to effect the clutch-to-clutch shifting actions of the automatic transmission portion 20.

The hybrid control means 52 functions as continuously-variable shifting control means and is arranged to control the engine 8 to be operated in an operating range of high efficiency, and control the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio γ0 of the differential portion 11 operating as the electrically controlled continuously variable transmission, while the transmission mechanism 10 is placed in the continuously-variable shifting state, that is, while the differential portion 11 is placed in the differential state. For instance, the hybrid control means 52 calculates a target (required) vehicle output at the present running speed V of the vehicle, on the basis of the operating amount $A_{CC}$ of the accelerator pedal 46 used as an operator's required vehicle output and the vehicle running speed V, and calculate a target total vehicle output on the basis of the calculated target vehicle output and a required amount of generation of an electric energy by the first electric motor M1. The hybrid control means 52 calculates a target output of the engine 8 to obtain the calculated target total vehicle output, while taking account of a power transmission loss, a load acting on various devices of the vehicle, an assisting torque generated by the second electric motor M2, etc. The hybrid control means 52 controls the speed $N_E$ and torque $T_E$ of the engine 8, so as to obtain the calculated target engine output, and the amount of generation of the electric energy by the first electric motor M1.

The hybrid control means 52 is arranged to implement the hybrid control while taking account of the presently selected gear position of the automatic transmission portion 20, so as to improve the drivability of the vehicle and the fuel economy of the engine 8. In the hybrid control, the differential portion 11 is controlled to function as the electrically controlled continuously-variable transmission, for optimum coordination of the engine speed $N_E$ and vehicle speed V for efficient operation of the engine 8, and the rotating speed of the power transmitting member 18 determined by the selected gear position of the transmission portion 20. That is, the hybrid control means 52 determines a target value of the overall speed ratio γT of the transmission mechanism 10, so that the engine 8 is operated according to a stored highest-fuel-economy curve (fuel-economy map or relation). The target value of the overall speed ratio γT of the transmission mechanism 10 permits the engine torque $T_E$ and speed $N_E$ to be controlled so that the engine 8 provides an output necessary for obtaining the target vehicle output (target total vehicle output or required vehicle drive force). The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the engine torque $T_E$. The hybrid control means 52 controls the speed ratio γ0 of the differential portion 11, so as to obtain the target value of the overall speed ratio γT, so that the overall speed ratio γT can be controlled within a predetermined range, for example, between 13 and 0.5.

In the hybrid control, the hybrid control means 52 controls an inverter 58 such that the electric energy generated by the first electric motor M1 is supplied to an electric-energy storage device 60 and the second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2, so that the second electric motor M2 is operated with the supplied electric energy, to produce a mechanical energy to be transmitted to the power transmitting member 18. Thus, the drive system is provided with an electric path through which an electric energy generated by conversion of a portion of a drive force of the engine 8 is converted into a mechanical energy.

The hybrid control means 52 is further arranged to hold the engine speed $N_E$ substantially constant or at a desired value, by controlling the first electric motor speed $N_{M1}$ and/or the second electric motor speed $N_{M2}$ owing to the electric CVT function of the differential portion 11, irrespective of whether the vehicle is stationary or running. In other words, the hybrid control means 52 is capable of controlling the first electric motor speed $N_{M1}$ and/or the second electric motor speed $N_{M2}$ as desired while holding the engine speed $N_E$ substantially constant or at a desired value.

To raise the engine speed $N_E$ during running of the vehicle, for example, the hybrid control means 52 raises the operating speed $N_{M1}$ of the first electric motor M1 while the operating speed $N_{M2}$ of the second electric motor M2 determined by the vehicle speed V (speed of the drive wheels 38) is held substantially constant, as is apparent from the collinear chart of FIG. 3. To hold the engine speed $N_E$ substantially constant during a shifting operation of the automatic transmission portion 20, the hybrid control means 52 changes the first electric motor speed $N_{M1}$ in a direction opposite to the direction of change of the second electric motor speed $N_{M2}$ caused by the shifting operation of the automatic transmission portion 20, while the engine speed $N_E$ is held substantially constant.

The hybrid control means 52 includes engine output control means functioning to control the engine 8, so as to provide a required output, by controlling the throttle actuator 97 to open and close the electronic throttle valve 96, and controlling an amount and time of fuel injection by the fuel injecting device 98 into the engine 8, and/or the timing of ignition of the igniter by the ignition device 99, alone or in combination. For instance, the hybrid control means 52 is basically arranged to control the throttle actuator 97 on the basis of the operating amount $A_{CC}$ of the accelerator pedal 45 (manually operable vehicle accelerating member) and according to a predetermined stored relationship (not shown) between the operating amount $A_{CC}$ and the opening angle $\theta_{TH}$ of the electronic throttle valve 96 such that the opening angle $\theta_{TH}$ increases with an increase of the operating amount $A_{CC}$. The engine output control device 43 controls the throttle actuator 97 to open and close the electronic throttle valve 96, controls the fuel injecting device 98 to control the fuel injection, and controls the ignition device 99 to control the ignition timing of the igniter, for thereby controlling the torque of the engine 8, according to the commands received from the hybrid control means 52.

Figure 6:
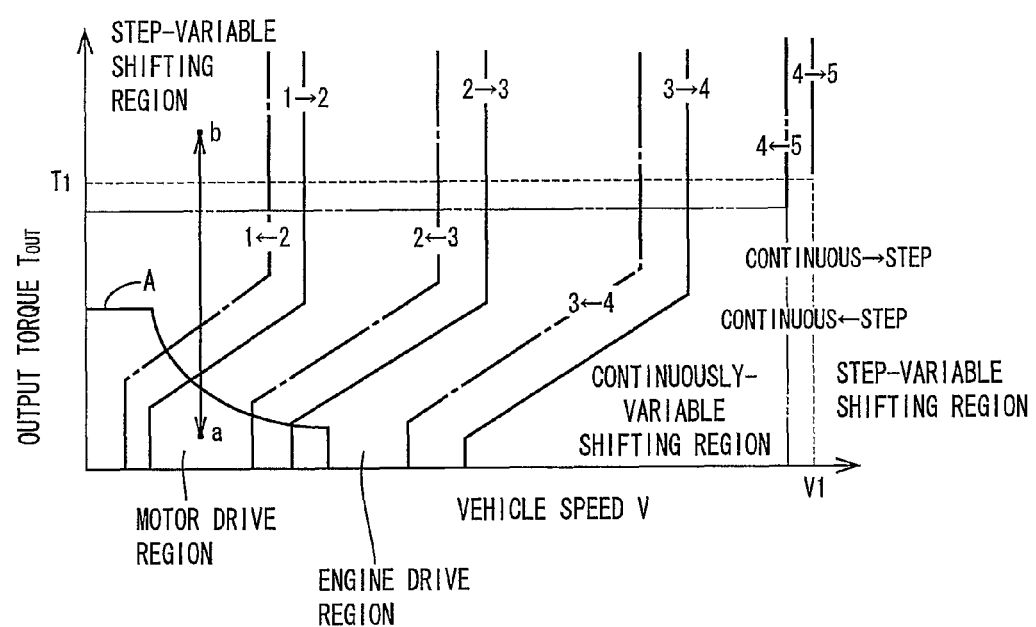
FIG. 6 is a view illustrating an example of a stored shifting boundary line map used for determining a shifting action of an automatic transmission portion, an example of a stored switching boundary line map used for switching the shifting state of a transmission mechanism, and an example of a stored drive-power-source switching boundary line map defining boundary lines between an engine drive region and a motor drive region for switching between an engine drive mode and a motor drive mode, in the same two-dimensional coordinate system defined by control parameters in the form of a running speed and an output torque of the vehicle, such that those maps are related to each other.
Figure 7:
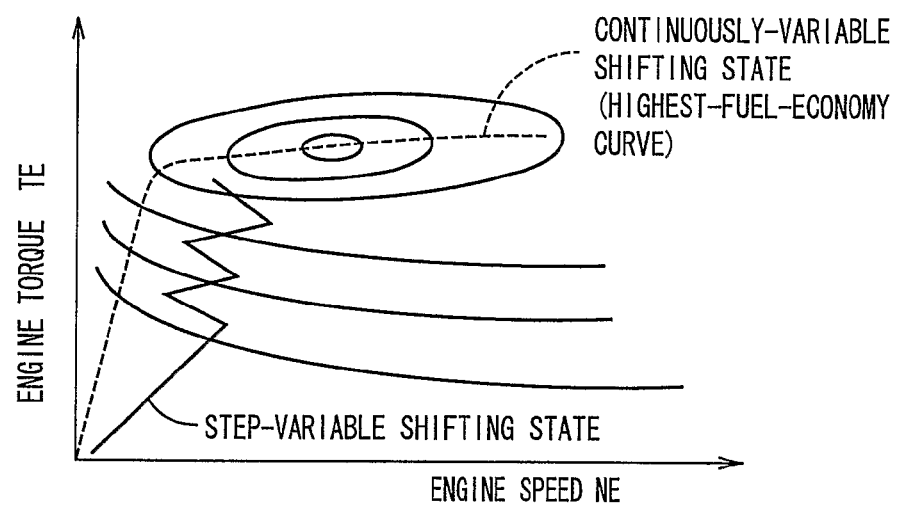
FIG. 7 is a view illustrating an example of a fuel consumption map defining a highest-fuel-economy curve of an engine, and explaining a difference between an operation of the engine in a continuously-variable shifting state (indicated by broken line) of the transmission mechanism and an operation of the engine in a step-variable shifting state (indicated by one-dot chain line) of the transmission mechanism.

The hybrid control means 52 is capable of establishing a motor-drive mode to drive the vehicle by the electric motor M2, by utilizing the electric CVT function of the differential portion 11, irrespective of whether the engine 8 is in the non-operated state or in the idling state. Solid line A in FIG. 6 represents an example of a boundary line defining an engine-drive region and a motor-drive region, for switching the vehicle drive power source for starting and driving the vehicle (hereinafter referred to as "drive power source"), between the engine 8 and the electric motor (e.g., second electric motor M2). In other words, the vehicle drive mode is switchable between a so-called "engine drive mode" corresponding to the engine-drive region in which the vehicle is started and driven with the engine 8 used as the drive power source, and the so-called "motor-drive mode" corresponding to the motor-drive region in which the vehicle is driven with the second electric motor M2 used as the drive power source. A predetermined stored relationship representing the boundary line (solid line A) of FIG. 6 for switching between the engine-drive mode and the motor-drive mode is an example of a drive-power-source switching map (drive-power-source map) in a two-dimensional coordinate system defined by control parameters in the form of the vehicle speed V and a drive-force-related value in the form of the output torque $T_{OUT}$. This drive-power-source switching map is stored in the memory means 56, together with the shifting boundary line map (shifting map) indicated by solid lines and one-dot chain lines in FIG. 6.

The hybrid control means 52 determines whether the vehicle condition is in the motor-drive region or engine-drive region, and establishes the motor-drive mode or engine-drive mode. This determination is made on the basis of the vehicle condition represented by the vehicle speed V and the required output torque $T_{OUT}$, and according to the drive-power-source switching map of FIG. 6. As is understood from FIG. 6, the motor-drive mode is generally established by the hybrid control means 52, when the output torque $T_{OUT}$ is in a comparatively low range in which the engine efficiency is comparatively low, namely, when the engine torque $T_E$ is in a comparatively low range, or when the vehicle speed V is in a comparatively low range, that is, when the vehicle load is comparatively low. Usually, therefore, the vehicle is started in the motor-drive mode, rather than in the engine-drive mode. When the vehicle condition upon starting of the vehicle is outside the motor-drive region defined by the drive-power-source switching map of FIG. 6, as a result of an increase of the required output torque $T_{out}$ or engine torque $T_E$ due to an operation of the accelerator pedal 45, the vehicle may be started in the engine-drive mode.

For reducing a dragging of the engine 8 in its non-operated state and improving the fuel economy in the motor-drive mode, the hybrid control means 52 is arranged to hold the engine speed $N_E$ at zero or substantially zero as needed, owing to the electric CVT function (differential function) of the differential portion 11, that is, by controlling the differential portion 11 to perform its electric CVT function (differential function), so that the first electric motor speed is controlled so as to be freely rotated to have a negative speed $N_{M1}$.

The hybrid control means 52 is further capable of performing a so-called "torque assist" operation to assist the engine 8, by supplying an electric energy from the first electric motor M1 or the electric-energy storage device 60 to the second electric motor M2, so that the second electric motor M2 is operated to transmit a drive torque to the drive wheels 38. Thus, the second electric motor M2 may be used in addition to the engine 8, in the engine-drive mode. The torque assist operation may be performed to increase the output torque of the second electric motor M2 in the motor drive mode.

The hybrid control means 52 is arranged to hold the engine 8 in an operated state owing to the electric CVT function of the differential portion 11, irrespective of whether the vehicle is stationary or running at a relatively low speed. When the first electric motor M1 is required to be operated to charge the electric-energy storage device 60 while the vehicle is stationary, in order to charge the electric-energy storage device 60 where the electric energy amount SOC stored in the storage device 60 is reduced, the speed $N_E$ of the engine 8 which is operated to operate the first electric motor M1 at a relatively high speed can be kept high enough to permit the operation of the engine 8 by itself, owing to the differential function of the power distribution mechanism 16, even while the operating speed of the second electric motor M2 determined by the vehicle speed V is zero (substantially zero) when the vehicle is stationary.

The hybrid control means 52 is further arranged to place the first electric motor M1 in a non-load state by cutting off an electric current applied from the electric energy storage device 60 to the first electric motor M1 through the inverter 58. When the first electric motor M1 is placed in the non-load state, the first electric motor M1 is permitted to be freely rotated, and the differential portion is placed in a state similar to the power cut-off state in which power cannot be transmitted through the power transmitting path within the differential portion 11, and no output can be generated from the differential portion 11. Namely, the hybrid control means 52 is arranged to place the first electric motor M1 in the non-load state, for thereby placing the differential portion 11 in a neutral state in which the power transmitting path is electrically cut off.

The high-speed-gear determining means 62 is arranged to determine whether the gear position to which the transmission mechanism 10 should be shifted on the basis of the vehicle condition and according to the shifting boundary line map stored in the memory means 56 and indicated in FIG. 6 by way of example is a high-speed-gear position, for example, the fifth gear position. This determination is made by determining whether the gear position selected by the step-variable shifting control means 54 is the fifth gear position or not, for determining which one of the switching clutch C0 and brake B0 should be engaged to place the transmission mechanism 10 in the step-variable shifting state.

The switching control means 50 is arranged to selectively switch the transmission mechanism 10 between the continuously-variable shifting state and the step-variable shifting state, that is between the differential state and the locked state, by engaging and releasing the coupling devices (switching clutch C0 and brake B0) on the basis of the vehicle condition. For example, the switching control means 50 is arranged to determine whether the shifting state of the transmission mechanism 10 (differential portion 11) should be changed, on the basis of the vehicle condition represented by the vehicle speed V and the required output torque $T_{OUT}$ and according to the switching boundary line map (switching control map or relation) stored in the memory means 56 and indicated by two-dot chain line in FIG. 6 by way of example, namely, whether the vehicle condition is in the continuously-variable shifting region for placing the transmission mechanism 10 in the continuously-variable shifting state, or in the step-variable shifting region for placing the transmission mechanism 10 in the step-variable shifting state. The switching control means 50 places the transmission mechanism 10 in the continuously-variable shifting state or step-variable shifting state, depending upon whether the vehicle condition is in the continuously-variable shifting region or in the step-variable shifting region. Thus, the switching control means 50 limits the electrically controlled differential function of the differential portion 11 by placing the differential portion 11 in the step-variable shifting state by controlling the switching clutch C0 and/or the switching brake B0. That is, the switching control means 50 functions as differential limiting means for limiting the function of the differential portion 11 as the electrically controlled continuously variable transmission.

Described in detail, when the switching control means 50 determines that the vehicle condition is in the step-variable shifting region, the switching control means 50 disables the hybrid control means 52 to implement a hybrid control or continuously-variable shifting control, and enables the step-variable shifting control means 54 to implement a predetermined step-variable shifting control in which the transmission portion 20 is automatically shifted according to the shifting boundary line map stored in the memory means 56 and indicated in FIG. 6 by way of example. FIG. 2 indicates the combinations of the engaging actions of the hydraulically operated frictional coupling devices C0, C1, C2, B0, B1, B2 and B3, which are stored in the memory means 56 and which are selectively used for automatic shifting of the automatic transmission portion 20. In the step-variable shifting state, the transmission mechanism 10 as a whole constituted by the differential portion 11 and the automatic transmission portion 20 functions as a so-called step-variable automatic transmission which is automatically shifted according to the table of FIG. 2.

When the high-speed-gear determining means 62 has determined that the transmission mechanism 10 should be shifted to the fifth gear position, the switching control means 50 commands the hydraulic control unit 42 to release the switching clutch C0 and engage the switching brake B0, for enabling the differential portion 11 to function as an auxiliary transmission having a fixed speed ratio $\gamma 0$ of 0.7, for example, so that the transmission mechanism 10 as a whole is placed in a high-speed gear position so-called "an overdrive gear position" having a speed ratio lower than 1.0. When the high-speed-gear determining means 62 has not determined that the transmission mechanism 10 should be shifted to the fifth gear position, the switching control means 50 commands the hydraulic control unit 42 to engage the switching clutch C0 and release the switching brake B0, for enabling the differential portion 11 to function as an auxiliary transmission having a fixed speed ratio $\gamma 0$ of 1.0, for example, so that the transmission mechanism 10 as a whole is placed in a speed-reducing gear position having a speed ratio not lower than 1.0. Thus, when the transmission mechanism 10 is switched to the step-variable shifting state by the switching control means 50, the differential portion 11 operable as the auxiliary transmission is placed in a selected one of two gear positions under the control of the switching control means 50 while the automatic transmission portion 20 connected in series to the differential portion 11 functions as a step-variable transmission, so that the transmission mechanism 10 as a whole functions as the so-called step-variable automatic transmission.

When the switching control means 50 has determined that the vehicle condition is in the continuously-variable shifting region for placing the transmission mechanism 10 in the continuously-variable shifting state, the switching control means 50 commands the hydraulic control unit 42 to release both of the switching clutch C0 and brake B0, for placing the differential portion 11 in the continuously-variable shifting state. At the same time, the switching control means 50 enables the hybrid control means 52 to implement the hybrid control, and commands the step-variable shifting control means 54 to select and hold a predetermined one of the gear positions, or to permit the automatic transmission portion 20 to be automatically shifted according to the shifting boundary line map stored in the map memory 56 and indicated in FIG. 6 by way of example. In the latter case, the variable-step shifting control means 54 implements the automatic shifting control by suitably selecting the combinations of the operating states of the frictional coupling devices indicated in the table of FIG. 2, except the combinations including the engagement of the switching clutch C0 and brake B0. Thus, the differential portion 11 switched to the continuously-variable shifting state under the control of the switching control means 50 functions as the continuously variable transmission while the automatic transmission portion 20 connected in series to the differential portion 11 functions as the step-variable transmission, so that the transmission mechanism 10 provides a sufficient vehicle drive force, such that the input speed $N_{IN}$ of the automatic transmission portion 20 placed in one of the first through fourth gear positions, namely, the rotating speed $N_{18}$ of the power transmitting member 18 is continuously changed, so that the speed ratio of the transmission mechanism 10 when the transmission portion 20 is placed in one of those gear positions is continuously variable over a predetermined range. Accordingly, the speed ratio of the automatic transmission portion 20 is continuously variable across the adjacent gear positions, whereby the total speed ratio γT of the transmission mechanism 10 is continuously variable.

The maps of FIG. 6 will be described in detail. The shifting boundary line map (shifting control map or relation) shown in FIG. 6 by way of example and stored in the memory means 56 is used for determining whether the automatic transmission portion 20 should be shifted, and is defined in a two-dimensional coordinate system by control parameters consisting of the vehicle speed V and the drive-force-related value in the form of the required output torque $T_{OUT}$. In FIG. 6, the solid lines indicate the shift-up boundary lines, while the one-dot chain lines indicate the shift-down boundary lines.

The broken lines in FIG. 6 represent the upper vehicle-speed limit V1 and the upper output-torque limit T1 which are used for the switching control means 50 to determine whether the vehicle condition is in the step-variable shifting region or the continuously-variable shifting region. In other words, the broken lines represent a high-speed-running boundary line indicative of the upper vehicle-speed limit V1 above which it is determined that the hybrid vehicle is in a high-speed running state, and a high-output-running boundary line indicative of the upper output-torque limit T1 of the output torque $T_{OUT}$ of the automatic transmission portion 20 above which it is determined that the hybrid vehicle is in a high-output running state. The output torque $T_{OUT}$ is an example of the drive-force-related value which relates to the drive force of the hybrid vehicle. FIG. 6 also shows two-dot chain lines which are offset with respect to the broken lines, by a suitable amount of control hysteresis for determination as to whether the step-variable shifting state is changed to the continuously-variable shifting state or vice versa. Thus, the broken lines and two-dot chain lines of FIG. 6 constitute the stored switching boundary line map (switching control map or relation) used by the switching control means 50 to determine whether the vehicle condition is in the step-variable shifting region or the continuously-variable shifting region, depending upon whether the control parameters in the form of the vehicle speed V and the output torque $T_{OUT}$ are higher than the predetermined upper limit values V, T1. This switching boundary line map may be stored in the memory means 56, together with the shifting boundary line map. The switching boundary line map may use at least one of the upper vehicle-speed limit V1 and the upper output-torque limit T1, or at least one of the vehicle speed V and the output torque $T_{OUT}$, as at least one parameter.

The above-described shifting boundary line map, switching boundary line, and drive-power-source switching map may be replaced by stored equations for comparison of the actual vehicle speed V with the limit value V1 and comparison of the actual output torque $T_{OUT}$ with the limit value T1. In this case, the switching control means 50 switches the transmission mechanism 10 in the step-variable shifting state by engaging the switching brake B0, when the actual vehicle speed V has exceeded the upper limit V1, or by engaging the switching clutch C0, when the output torque $T_{OUT}$ of the automatic transmission portion 20 has exceeded the upper limit T1.

The switching control means 50 may be arranged to place the transmission mechanism 10 in the step-variable shifting state even when the vehicle condition is in the continuously-variable shifting region, upon detection of any functional failure or deterioration of the electric components such as the electric motors which are operable to operate the differential portion 11 as the electrically controlled continuously variable transmission. Those electric components include components such as the first electric motor M1, second electric motor M2, inverter 58, electric-energy storage device 50 and electric lines interconnecting those components, which are associated with the electric path through which an electric energy generated by the first electric motor M1 is converted into a mechanical energy. The functional deterioration of the components may be caused by their failure or a drop of their temperatures.

The drive-force-related value indicated above is a parameter corresponding to the drive force of the vehicle, which may be the output torque $T_{OUT}$ of the automatic transmission portion 20, the engine output torque $T_E$ or an acceleration value G of the vehicle, as well as a drive torque or drive force of drive wheels 38. The parameter may be: an actual value calculated on the basis of the operating amount $A_{CC}$ of the accelerator pedal 45 or the opening angle of the throttle valve (or intake air quantity, air/fuel ratio or amount of fuel injection) and the engine speed $N_E$; or any one of estimated values of the required (target) engine torque $T_E$, required (target) output torque $T_{OUT}$ of the transmission portion 20 and required vehicle drive force, which are calculated on the basis of the operating amount $A_{CC}$ of the accelerator pedal 45 or the operating angle of the throttle valve. The above-described vehicle drive torque may be calculated on the basis of not only the output torque $T_{OUT}$, etc., but also the ratio of the differential gear device 36 and the radius of the drive wheels 38, or may be directly detected by a torque sensor or the like.

For instance, the upper vehicle-speed limit V1 is determined so that the transmission mechanism 10 is placed in the step-variable shifting state while the vehicle is in the high-speed running state. This determination is effective to reduce a possibility of deterioration of the fuel economy of the vehicle if the transmission mechanism 10 were placed in the continuously-variable shifting state while the vehicle is in the high-speed running state. That is, in the high-speed running state, the transmission mechanism 10 is effectively utilized as a planetary gear type step-variable transmission which does not include an electric path and has a high degree of power transmitting efficiency.

The upper output-torque limit T1 is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle. Alternatively, the upper output-torque limit T1 is determined such that the transmission mechanism 10 is placed in the step-variable shifting state in the high-speed running state, that is, functions as a step-variable transmission the speed ratio of which is variable in steps, rather than as a continuously variable transmission. This determination is based on a desire of the vehicle operator to have the engine speed changing as a result of a shifting action of the transmission, which desire is higher than a desire of the vehicle operator to improve the fuel economy, in the high-output running state of the vehicle.

Figure 8:
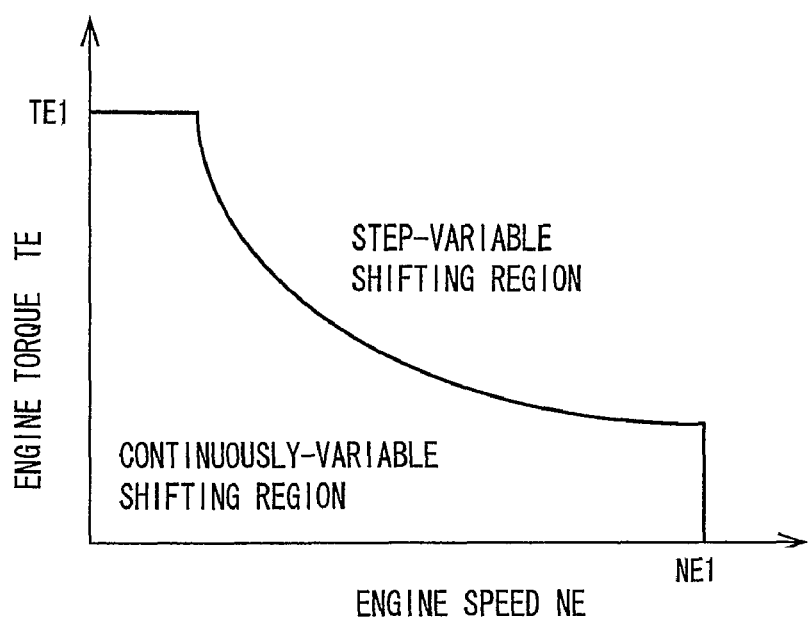
FIG. 8 is a view illustrating a stored relationship defining boundary lines between a continuously-variable shifting region and a step-variable shifting region, which relationship is used to map boundary lines defining the continuously-variable and step-variable shifting regions which are indicated by broken lines in FIG. 6.

Referring to FIG. 8, there is shown a switching boundary line map (switching control map or relation) which is stored in the memory means 56 and which defines engine-output lines serving as boundary lines used by the switching control means 50 to determine whether the vehicle condition is in the step-variable or continuously-variable shifting region. These engine-output lines are defined by control parameters in the form of the engine speed $N_E$ and the engine torque $T_E$. The switching control means 50 may use the switching boundary line map of FIG. 8 in place of the switching boundary line map of FIG. 6, to determine whether the vehicle condition is in the continuously-variable or step-variable shifting region, on the basis of the engine speed $N_E$ and engine torque $T_E$. The switching boundary line map of FIG. 6 may be based on the switching boundary line map of FIG. 8. In other words, the broken lines in FIG. 6 may be determined on the basis of the relation (map) of FIG. 8, in the two-dimensional coordinate system defined by the control parameters in the for of the vehicle speed V and the output torque $T_{OUT}$.

The step-variable shifting region defined by the switching boundary line map of FIG. 6 is defined as a high-torque drive region in which the output torque $T_{OUT}$ is not lower than the predetermined upper limit T1, or a high-speed drive region in which the vehicle speed V is not lower than the predetermined upper limit V1. Accordingly, the step-variable shifting control is implemented when the torque of the engine 8 is comparatively high or when the vehicle speed V is comparatively high, while the continuously-variable shifting control is implemented when the torque of the engine 8 is comparatively low or when the vehicle speed V is comparatively low, that is, when the engine 8 is in a normal output state.

Similarly, the step-variable shifting region defined by the switching boundary line map of FIG. 8 is defined as a high-torque drive region in which the engine torque $T_E$ is not lower than the predetermined upper limit TE1, or a high-speed drive region in which the engine speed $N_E$ is not lower than the predetermined upper limit NE1, or alternatively defined as a high-output drive region in which the output of the engine 8 calculated on the basis of the engine torque $T_E$ and speed $N_E$ is not lower than a predetermined limit. Accordingly, the step-variable shifting control is implemented when the torque $T_E$, speed $N_E$ or output of the engine 8 is comparatively high, while the continuously-variable shifting control is implemented when the torque $N_T$, speed $N_E$ or output of the engine 8 is comparatively low, that is, when the engine 8 is in the normal output state. The boundary lines of the switching boundary switching map of FIG. 8 may be considered as high-speed threshold lines or high-engine-output threshold lines, which define upper limit of the vehicle speed V or engine output.

In the present embodiment described above, the transmission mechanism 10 is placed in the continuously-variable shifting state in a low-speed or medium-speed running state of the vehicle or in a low-output or medium-output running state of the vehicle, assuring a high degree of fuel economy of the vehicle. In a high-speed running of the vehicle at the vehicle speed V higher than the upper limit V1, the transmission mechanism 10 is placed in the step-variable shifting state in which the output of the engine 8 is transmitted to the drive wheels 38 primarily through the mechanical power transmitting path, so that the fuel economy is improved owing to reduction of a loss of conversion of the mechanical energy into the electric energy, which would take place when the differential portion 11 functions as the electrically controlled continuously variable transmission.

In a high-output running state of the vehicle with the output torque $T_{OUT}$ higher than the upper limit T1, too, the transmission mechanism 10 is placed in the step-variable shifting state. Therefore, the transmission mechanism 10 is placed in the continuously-variable shifting state only when the vehicle speed V is relatively low or medium or when the engine output is relatively low or medium, so that the required amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required sizes of the first electric motor M1 and the second electric motor M2, and the required size of the drive system including those electric motors.

Namely, the upper limit TE1 is determined such that the first electric motor M1 can withstand the reaction torque when the engine output $T_E$ is not higher than the upper limit TE1, and the differential portion 11 is placed in the step-variable shifting state when the vehicle is in the high-output running state in which the engine torque $T_E$ is higher than the upper limit TE1. In the step-variable shifting state of the transmission portion 11, therefore, the first electric motor M1 need not withstand the reaction torque with respect to the engine torque $T_E$ as in the continuously-variable shifting state of the transmission portion 11, making it possible to reduce deterioration of durability of the first electric motor M1 while preventing an increase of its required size. In other words, the required maximum output of the first electric motor M1 in the present embodiment can be made smaller than its reaction torque capacity corresponding to the maximum value of the engine output $T_E$. That is, the required maximum output of the first electric motor M1 can be determined such that its reaction torque capacity is smaller than a value corresponding to the engine torque $T_E$ exceeding the upper limit TE1, so that the first electric motor M1 can be small-sized.

The maximum output of the first electric motor M1 is a nominal rating of this motor which is determined by experimentation in the environment in which the motor is operated. The above-described upper limit of the engine torque $T_E$ is determined by experimentation such that the upper limit is a value which is equal to or lower than the maximum value of the engine torque $T_E$, and below which the first electric motor M1 can withstand the reaction torque, so that the deterioration of durability of the first electric motor M1 can be reduced.

Figure 9:
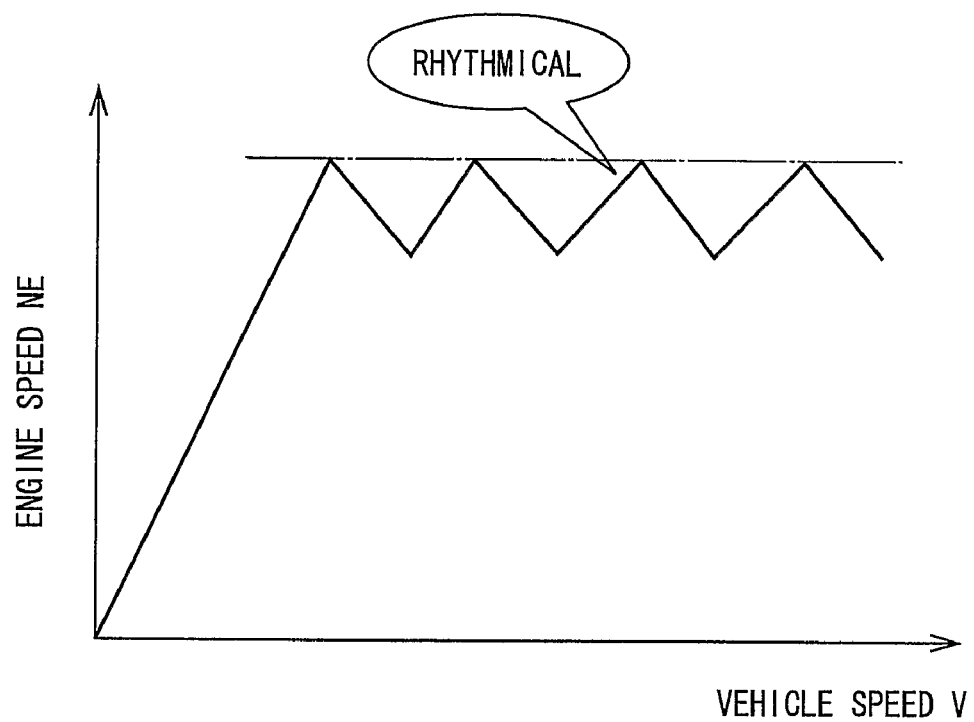
FIG. 9 is a view indicating an example of a change of the engine speed as a result of a shift-up action of the step-variable transmission.

In the high-output running state of the vehicle in which the vehicle operator has a stronger desire for improved drivability of the vehicle rather than improved fuel economy, the transmission mechanism 10 is placed in the step-variable shifting state (fixed-speed-ratio shifting state), rather than in the continuously-variable shifting state, so that the engine speed $N_E$ changes with a shift-up action of the automatic transmission portion 20, assuring a comfortable rhythmic change of the engine speed $N_E$ as the transmission portion 20 is shifted up, as indicated in FIG. 9.

When the vehicle is required to be accelerated or decelerated, the hybrid control means 52 controls the engine 8 such that the engine torque $T_E$ changes with a change of the operating amount $A_{CC}$ of the accelerator pedal 45 or the vehicle speed V, namely, such that the engine torque $T_E$ changes according to a depressing operation or a releasing operation of the accelerator pedal 45. It is considered that the vehicle operator feels comfortable with a phenomenon that a change of the engine torque $T_E$ according to the depressing or releasing operation of the accelerator pedal 45 is reflected directly on a drive torque of the drive wheels 38. On the other hand, a transfer of the change of the engine torque $T_E$ to the drive wheels 38 causes a shock of the vehicular drive system, which increases with a rate of change of the engine torque $T_E$.

In a vehicular drive system well known in the art wherein a fluid-operated power transmitting device such as a torque converter or fluid coupling is disposed in a power transmitting path between a step-variable transmission and an engine, the fluid-operated power transmitting device allows a difference in speed between the engine and the step-variable transmission, and functions to reduce an amount of change of the torque of the drive wheels 38 as compared with an amount of change of the engine torque $T_E$, whereby the shock of the drive system upon a depressing or releasing operation of the accelerator pedal.

The present transmission mechanism 10 is not provided with a fluid-operated power transmitting device between the engine 8 and the automatic transmission portion 20, but the engine speed $N_E$ can be controlled relative to the vehicle speed V, as needed, by the differential function of the differential portion 11. Accordingly, an increase of the engine torque $T_E$ upon acceleration of the vehicle by a depressing operation of the accelerator pedal 45, for example, is consumed by a change of the engine speed $N_E$, as an inertia of the engine 8, so that an amount of change of the torque transmitted to the drive wheels 38 is reduced, with a result of a decrease of the shock caused by the depressing operation of the accelerator pedal 45. Upon deceleration of the vehicle by a releasing operation of the accelerator pedal 45, the engine speed $N_E$ can be lowered as needed, an abrupt reduction of the rotating speed of the drive wheels 38 due to an engine braking effect can be prevented, so that it is possible to prevent easy generation of a shock of the drive system due to the releasing operation of the accelerator peal 45. Thus, the differential function of the differential portion 11 allows a free change or control of the engine speed $N_E$, and more or less absorbs the change of the engine torque $T_E$ due to a change of the operating amount $A_{CC}$ of the accelerator pedal 45, making it possible to reduce the shock of the drive system caused by the depressing or releasing operation of the accelerator pedal 45.

In the present transmission mechanism 10 (differential portion 11 or power distributing mechanism 16) which is selectively switchable between the continuously-variable shifting state (differential state) and the step-variable shifting state (lock state), however, the differential function of the differential portion 11 is limited when the differential portion 11 is placed in the step-variable shifting state. In this step-variable shifting state of the differential portion 11, therefore, a change of the engine torque $T_E$ due to a change of the operating amount $A_{CC}$ of the accelerator pedal 45 is directly transmitted to the drive wheels 38, so that the vehicular drive system has a risk of suffering a higher shock upon depression or releasing of the accelerator pedal 45, than in the continuously-variable shifting state. That is, the amount of shock of the vehicular drive system due to the depressing or releasing operation of the accelerator pedal 45 varies depending upon whether the differential function of the differential portion 11 is limited or not, namely, whether the differential portion 11 is placed in the continuously-variable shifting state or step-variable shifting state.

In view of the fact described above, the control device in the form of the electronic control device 40 according to the present embodiment of the invention is arranged to control a response of an input torque $T_{11}$ of the differential portion 11 to the depressing or releasing operation of the accelerator pedal 45 to accelerate or decelerate the vehicle, depending upon whether the differential function of the differential portion 11 is limited or not.

To this end, the accelerator-operating-amount determining means 80 of the electronic control device 40 is arranged to determine an amount of change $\Delta A_{CC}$ or a rate of change $A_{CC}'$ ($=dA_{CC}/dt$) of the operating amount $A_{CC}$ of the accelerator pedal 45, for determining whether the accelerator pedal 45 has been depressed or released (operated in the depressing or releasing direction), that is, whether the vehicle operator desires to accelerate or decelerate the vehicle.

For example, the accelerator-operating-amount determining means 80 determines whether an acceleration value of the vehicle as desired by the vehicle operator is larger than a predetermined upper limit, by determining whether the amount of increase $\Delta A_{CC}$ (positive value of the amount of change $\Delta A_{CC}$) of the operating amount $A_{CC}$ of the accelerator pedal 45 as a result of the depressing operation of the accelerator pedal 45 has exceeded a predetermined threshold $A_{CC}1$, or whether the rate of increase $A_{CC}'$ (positive value of the rate of change $A_{CC}'$) of the operating amount $A_{CC}$ of the accelerator pedal 45 as a result of the depressing operation of the accelerator pedal 45 has exceeded a predetermined threshold $A_{CC}1'$.

Further, the accelerator-operating-amount determining means 80 determines whether a deceleration value of the vehicle as desired by the vehicle operator is larger than a predetermined upper limit, by determining whether the amount of decrease $\Delta A_{CC}$ (negative value of the amount of change $\Delta A_{CC}$) of the operating amount $A_{CC}$ of the accelerator pedal 45 as a result of the releasing operation of the accelerator pedal 45 has exceeded a predetermined threshold $A_{CC}2$, or whether the rate of decrease $A_{CC}'$ (negative value of the rate of change $A_{CC}'$) of the operating amount $A_{CC}$ of the accelerator pedal 45 as a result of the releasing operation of the accelerator pedal 45 has exceeded a predetermined threshold $A_{CC}2'$.

The predetermined threshold $A_{CC}1$ or $A_{CC}2$ of the amount of change $\Delta A_{CC}$ and the predetermined threshold $A_{CC}1'$ or $A_{CC}2'$ of the rate of change $A_{CC}'$ are values corresponding to predetermined lower limits of the respective acceleration and deceleration values of the vehicle as desired by the vehicle operator, above which the response of the input torque $T_{11}$ of the differential portion 11 to the depressing or releasing operation of the accelerator pedal 45 should be controlled. In other words, the response of the input torque $T_{11}$ need not be controlled when the acceleration or deceleration value of the vehicle as desired by the vehicle operator is equal to or smaller than the predetermined upper limit. Those threshold values are obtained by experimentation and stored in the memory means 56.

The differential-state determining means 82 is arranged to determine whether the power distributing mechanism 16 is placed in the differential state, that is, whether the differential portion 11 is placed in the continuously-variable shifting state. This determination is made to cause the torque-response control means 84 to control the response of the input torque $T_{11}$ of the differential portion 11 to the depressing or releasing operation of the accelerator pedal 45, depending upon whether the differential function of the differential portion 11 is limited or not, when the accelerator-operating-amount determining means 80 has determined or detected the depressing or releasing operation of the accelerator pedal 45. For example, the differential-state determining means 82 determines whether the differential portion 11 is placed in the continuously-variable shifting state or not, by determining whether the vehicle condition represented by the vehicle speed V and the output torque $T_{OUT}$ is in the continuously-variable shifting region which is defined by the switching boundary line map of FIG. 6 and which is used by the switching control means 50 to place the transmission mechanism 10 in the continuously-variable shifting state, or in the step-variable shifting region also defined by the switching boundary line map and used by the switching control means 50 to place the transmission mechanism 10 in the step-variable shifting state.

The torque-response control means 84 is arranged to control the response of a change of the input torque $T_{11}$ of the differential portion 11 to the amount of decrease $\Delta A_{CC}$ of the operating amount $A_{CC}$ of the accelerator pedal 45 due to its releasing operation, for example, depending upon whether the differential function of the differential portion 11 is limited or not, so that the amount of shock of the vehicular drive system caused by the releasing operation of the accelerator pedal 45 when the differential portion 11 is placed in the step-variable shifting state is almost the same as that when the differential portion 11 is placed in the continuously-variable shifting state. The "response of the input torque $T_{11}$" described below refers to the response of the input torque $T_{11}$ to the amount of decrease $\Delta A_{CC}$ of the operating amount $A_{CC}$ of the accelerator pedal 45 due to its releasing operation, unless otherwise specified.

Described more specifically, the torque-response control means 84 changes or controls the response of the input torque $T_{11}$ of the differential portion 11, by changing a response of a change of the engine torque $T_E$ to the amount of decrease $\Delta A_{CC}$ of the operating amount $A_{CC}$ due to the releasing operation of the accelerator pedal 45. Namely, the torque-response control means 84 reduces the response of the input torque $T_{11}$ of the differential portion 11 by reducing the response of the engine torque $T_E$. The "response of the engine torque $T_E$" described below refers to the response of the engine torque $T_E$ to the amount of decrease $\Delta A_{CC}$ of the operating amount $A_{CC}$ of the accelerator pedal 45 due to its releasing operation, unless otherwise specified.

For instance, the torque-response control means 84 is arranged to change the response of the engine torque $T_E$ by smoothing, by a predetermined amount, a change of the engine torque $T_E$ as a result of the releasing operation of the accelerator pedal 45. Described in greater detail, the torque-response control means 84 changes the response of the input torque $T_{11}$ of the differential portion 11, by smoothing, by a predetermined amount, a change of the input torque $T_{11}$ to cause the input torque $T_{11}$ to smoothly change, by smoothing, by a predetermined amount, a change of the engine torque $T_E$ to cause the engine torque $T_E$ to smoothly change due to the releasing action of the accelerator pedal 45, so that the drive torque to be transmitted to the drive wheels 38 smoothly changes.

Figure 10A:
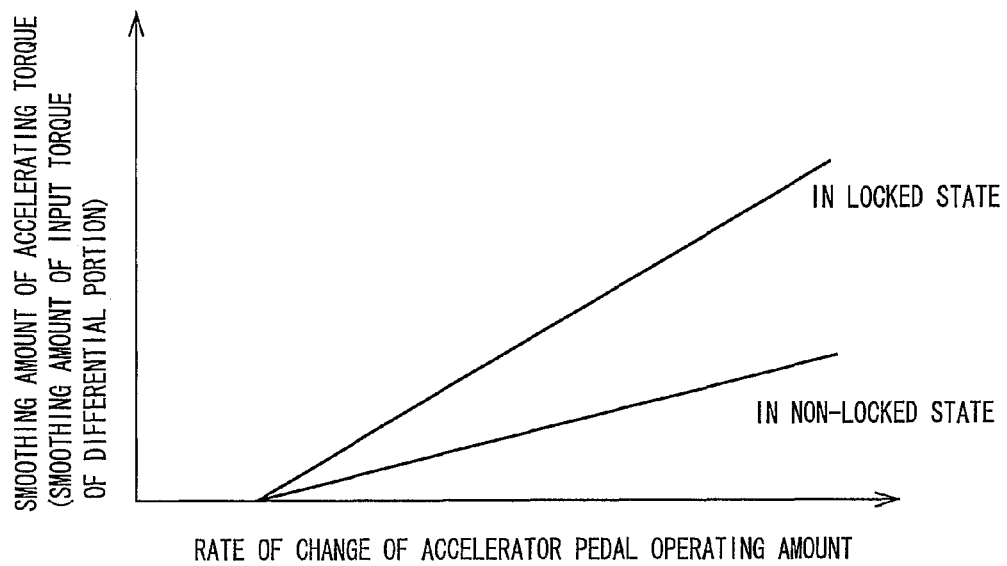
Figure 10B:
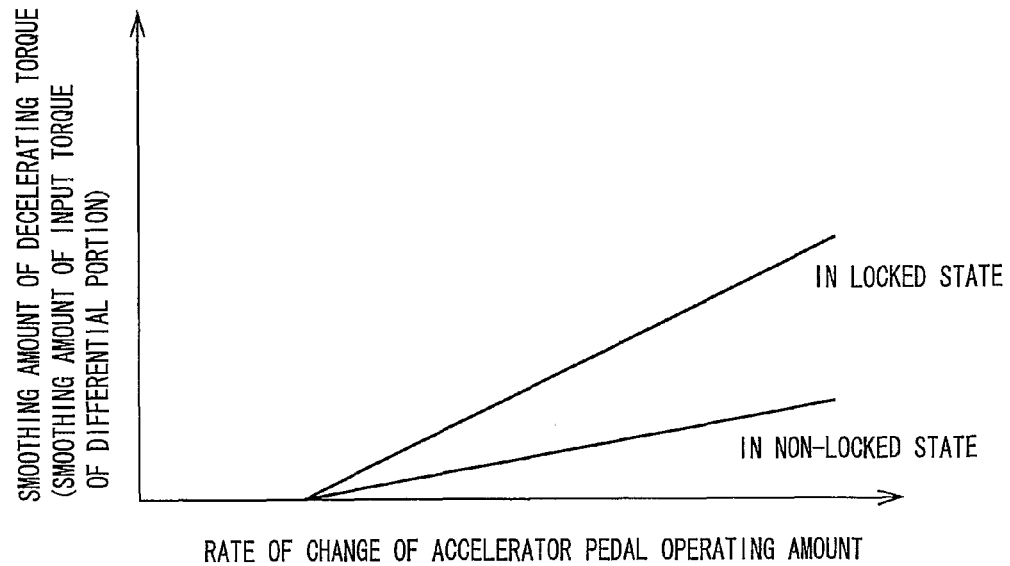
FIG. 10B is a view indicating an example of the relationship between the accelerator operating amount and the smoothing amount of the input torque when the accelerator pedal is released to decelerate the vehicle.

Referring to the graphs of FIGS. 10A and 10B, there are shown examples of predetermined relationships (maps) between the rate of change $A_{CC}'$ of the operating amount $A_{CC}$ of the accelerator pedal 45 and the predetermined amount of smoothing of the input torque T11 of the differential portion 11. The graph of FIG. 10A shows the two relationships between the smoothing amount of the input torque $T_{11}$ and the rate of increase $A_{CC}'$ of the operating amount $A_{CC}$ of the accelerator pedal 45 when the accelerator pedal 45 is depressed (operated toward the fully depressed position), while the graph of FIG. 10B shows the two relationships between the smoothing amount of the input torque $T_{11}$ and the rate of decrease $A_{CC}'$ of the operating amount $A_{CC}$ of the accelerator pedal 45 when the accelerator pedal 45 is released (operated toward the non-operated position). One of the two relationships is used when the differential portion 11 is placed in the step-variable shifting state (non-locked state), while the other relationship is used when the differential portion 11 is placed in the continuously-variable shifting state (locked state). Since there is a high possibility that the vehicular drive system has a higher shock due to the depressing and releasing operations of the accelerator pedal 45 when the differential portion 11 is placed in the locked state than when it is placed in the non-locked state, the four relationships are determined or formulated such that the smoothing amount of the input torque $T_{11}$ is larger in the locked state than in the non-locked state, as indicated in FIGS. 10A and 10B. Thus, the different relationships between the rate of change $A_{CC}'$ of the operating amount $A_{CC}$ of the accelerator pedal 45 and the input torque $T_{11}$ of the differential portion 11 are used depending upon when the differential portion 11 is placed in the step-variable shifting state (locked state) or in the continuously-variable shifting state (non-locked state).

The torque-response control means 84 determines the amount of smoothing of the input torque $T_{11}$ of the differential portion 11, on the basis of the rate of change $A_{CC}'$ of the operating amount $A_{CC}$ of the accelerator pedal 45 and according to one of the two relationships which is selected depending upon whether the differential portion 11 is placed in the locked state or not. The torque-response control means 84 smoothes the change of the engine torque $T_E$ to obtain the thus determined amount of smoothing of the input torque $T_{11}$ of the differential portion 11. When the accelerator pedal 45 is depressed to accelerate the vehicle, a rise of the engine torque $T_E$ is smoothed by the determined smoothing amount, to cause the engine torque $T_E$ to smoothly rise, so that the change of the drive torque to be transmitted to the drive wheels 38 is smoothed to reduce the amount of generation of the shock of the vehicular drive system. Similarly, when the accelerator pedal 45 is released or operated toward the non-operated position to decelerate the vehicle, a fall of the engine torque $T_E$ is smoothed by the determined smoothing amount, to cause the engine torque $T_E$ to smoothly fall, so that the change of the drive torque to be transmitted to the drive wheels 38 is smoothed to reduce the amount of generation of the shock of the vehicular drive system.

Thus, the torque-response control means 84 controls the response of the change of the input torque $T_{11}$ of the differential portion 11 to the change of the operating amount $A_{CC}$ of the accelerator pedal 45 such that the response is higher when the differential function of the differential portion 11 (power distributing mechanism 16) is not limited than when the differential function is limited.

To obtain the determined amount of smoothing of the change of the engine torque $T_E$ as a result of the depressing or releasing action of the accelerator pedal 45, the torque-response control means 84 commands the hybrid control means 52 to adjust the change of the engine torque $T_E$ by controlling the rate of change of the angle of opening of the electronic throttle valve 96, for example. According to the command received from the torque-response control means 84, the hybrid control means 52 commands the engine output control device 43 to increase the angle of opening of the electronic throttle valve 96 at a suitable rate to obtain the determined amount of smoothing of the change of the engine torque $T_E$, for example, the determined amount of smoothing of the increase of the engine torque $T_E$ upon the depressing or accelerating operation of the accelerator pedal 45. When the accelerator pedal 45 is released to decelerate the vehicle, on the other hand, the hybrid control means 52 commands the engine output control device 43 to reduce the angle of opening of the electronic throttle valve 96 at a suitable rate to obtain the determined amount of smoothing of the decrease of the engine torque $T_E$.

When the accelerator pedal 45 is depressed to accelerate the vehicle, in particular, the torque-response control means 84 may command the hybrid control means 52 to retard the ignition timing of the engine 8, as well as to reduce the rate of increase of the opening angle, for thereby reducing the rate of rise of the engine torque $T_E$, namely, for smoothing the rise of the engine torque $T_E$ as a result of the depressing operation of the accelerator pedal 45. According to the command received from the torque-response control means 84, the hybrid control means 52 commands the engine output control device 43 to retard the ignition timing of the engine 8 to obtain the determined amount of smoothing of the increase of the engine torque $T_E$ upon the depressing operation of the accelerator pedal 45 to accelerate the vehicle.

When the differential portion 11 is placed in the non-differential state (locked state), the engine 8 is mechanically connected to the drive wheels 38, so that a drive torque of the first electric motor M1 and/or the second electric motor M2 can be added to or subtracted from the engine torque $T_E$ to be transmitted to the drive wheels 38. In view of this fact, the torque-response control means 84 may be arranged to control or change the response of the input torque $T_{11}$ of the differential portion 11 by controlling the drive torque which is generated by the first electric motor M1 and/or the second electric motor M2 and which is added to or subtracted from the engine torque $T_E$, so as to reduce the amount of change of the engine torque $T_E$ to be caused by the depressing or releasing operation of the accelerator pedal 45 and transmitted to the drive wheels 38, in place of or in addition to controlling the response of the engine torque $T_E$ by adjusting the rate of change of the angle of opening of the electronic throttle valve 96 (and retarding the ignition timing of the engine 8).

For example, the torque-response control means 84 is arranged to control the response of the input torque $T_{11}$ of the differential portion 11, by smoothing the change of the input torque $T_{11}$ by the smoothing amount determined to cause the input torque $T_{11}$ to smoothly change, by controlling the drive torque of the first electric motor M1 and/or the second electric motor M2 to be added to or subtracted from the engine torque $T_E$, for smoothing the change of the engine torque $T_E$ to be caused by the depressing or releasing operation of the accelerator pedal 45, so that the drive torque to be transmitted to the drive wheels 38 is smoothly changed, without adjusting the rate of change of the opening angle of the electronic throttle valve 96 (and retarding the ignition timing of the engine 8).

Described in detail, the torque-response control means 84 determines the amount of smoothing of the change of the input torque $T_{11}$ of the differential portion 11 on the basis of the detected rate of change $A_{CC}'$ of the operating amount $A_{CC}$ of the accelerator pedal 45 and according to the appropriate one of the relationships shown in FIGS. 10A and 10B, and commands the hybrid control means 52 to control the drive torque of the first electric motor M1 and/or the second electric motor M2 to be added to or subtracted from the engine torque $T_E$, so as to reduce the amount of change of the engine torque according to the determined amount of smoothing. This arrangement permits reduction of the amount of rise of the engine torque $T_E$ to be caused by the depressing operation of the accelerator pedal 45, or the amount of fall of the engine torque $T_E$ to be caused by the releasing or decelerating operation of the accelerator pedal 45, so that the change of the drive torque to be transmitted to the drive wheels 38 is smoothed, resulting in reduction of the shock of the vehicular drive system. Where the change of the input torque $T_{11}$ of the differential portion 11 is smoothed by adding or subtracting the drive torque of the first electric motor M1 and/or the second electric motor to or from the engine torque $T_E$, in addition to adjusting the rate of change of the opening angle of the electronic throttle valve 96 (and retarding the ignition timing of the engine 8), the obtained amount of smoothing of the change of the input torque T11 is a sum of the amount of smoothing of the engine torque $T_E$ by the adjustment of the rate of change of the electronic throttle valve 96 (and the ignition timing retardation) and the amount of smoothing by the addition or subtraction of the drive torque of the first electric motor M1 and/or the second electric motor M2.

To obtain the determined amount of smoothing of the change of the input torque T11 of the differential portion 11, the torque-response control means 84 commands the hybrid control means 52 to adjust the output torque of the first electric motor M1 and/or the second electric motor M2, which is added to or subtracted to the engine torque $T_E$ which changes as a result of the depressing or releasing operation of the accelerator pedal 45. According to the command received from the torque-response control means 84, the hybrid control means 52 commands the inverter 58 to control the first electric motor M1 and/or the second electric motor M1 to generate a reverse drive torque by which the engine torque $T_E$ which increases as a result of the depression operation of the accelerator pedal 45 to accelerate the vehicle is reduced. When the accelerator pedal 45 is released to decelerate the vehicle, the hybrid control means 52 commands the inverter 58 to control the first electric motor M1 and/or the second electric motor M2 to generate a forward drive torque by which the engine torque $T_E$ which decreases as a result of the releasing or decelerating operation of the accelerator pedal 45 is increased.

The change of the input torque $T_{11}$ of the differential portion 11 can be smoothed by controlling the first electric motor M1 and/or the second electric motor M2 to generate the reverse or forward drive torque only when the differential portion 11 is placed in the locked state (non-differential state). However, a change of the input torque of the power transmitting member 18 can be smoothed by controlling the second electric motor M2 to generate the reverse or forward drive torque even when the differential portion 11 is placed in the non-locked state (differential state). Therefore, the torque-response control means 84 may be arranged to smooth the change of the input torque of the power transmitting member 18 by controlling the output torque of the second electric motor M2, rather than to smooth the change of the input torque $T_{11}$ of the differential portion 11. In this case, too, the drive torque to be transmitted to the drive wheels 38 can be smoothly changed so as to reduce the shock of the vehicular drive system.

When the depression operation of the accelerator pedal 45 is detected by the accelerator-operating-amount determining means 80 while the differential portion 11 is placed in the continuously-variable shifting state, the hybrid control means 52 increases the engine speed $N_E$ to reduce the shock caused by the depression operation of the accelerator pedal 45, so that the vehicle operator can feel the acceleration of the vehicle.

When the releasing operation of the accelerator pedal 45 is detected by the accelerator-operating-amount determining means 80 while the differential portion 11 is placed in the continuously-variable shifting state, the hybrid control means 52 reduces the engine speed $N_E$ to reduce the shock caused by the releasing operation of the accelerator pedal 45, so that the vehicle operator can feel the deceleration of the vehicle.

Figure 11:
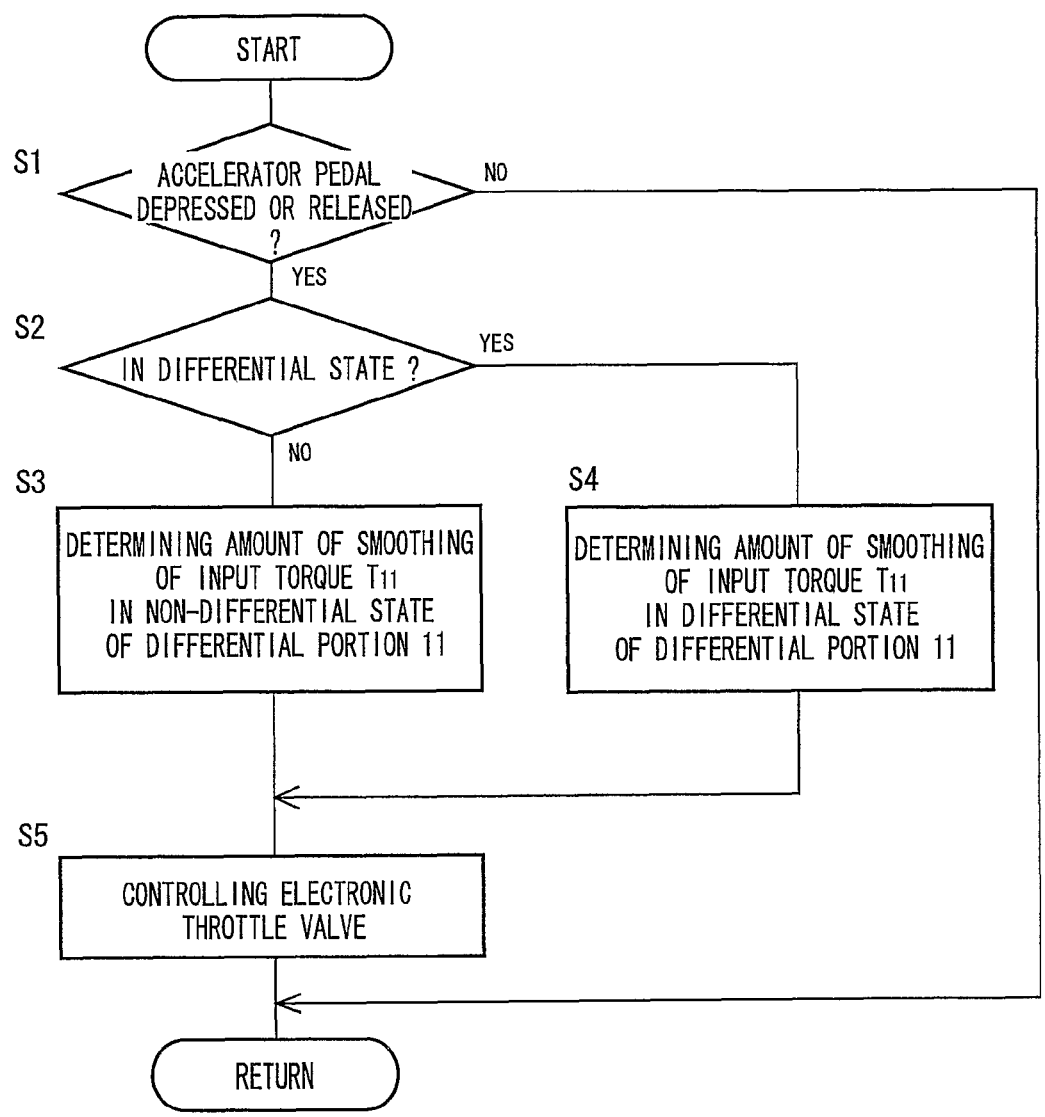
FIG. 11 is a flow chart illustrating an operation of the electronic control device of FIG. 5 to control a response of the input torque of the differential portion when the accelerator pedal is depressed or released.

The flow chart of FIG. 11 illustrates a major control operation performed by the electronic control device 40, that is, a torque response control routine for controlling a response of the input torque $T_{11}$ of the differential portion 11 to the depressing or releasing action of the accelerator pedal 45. This torque response control routine is executed with an extremely short cycle time of about several milliseconds to several tends of milliseconds.

Figure 12:
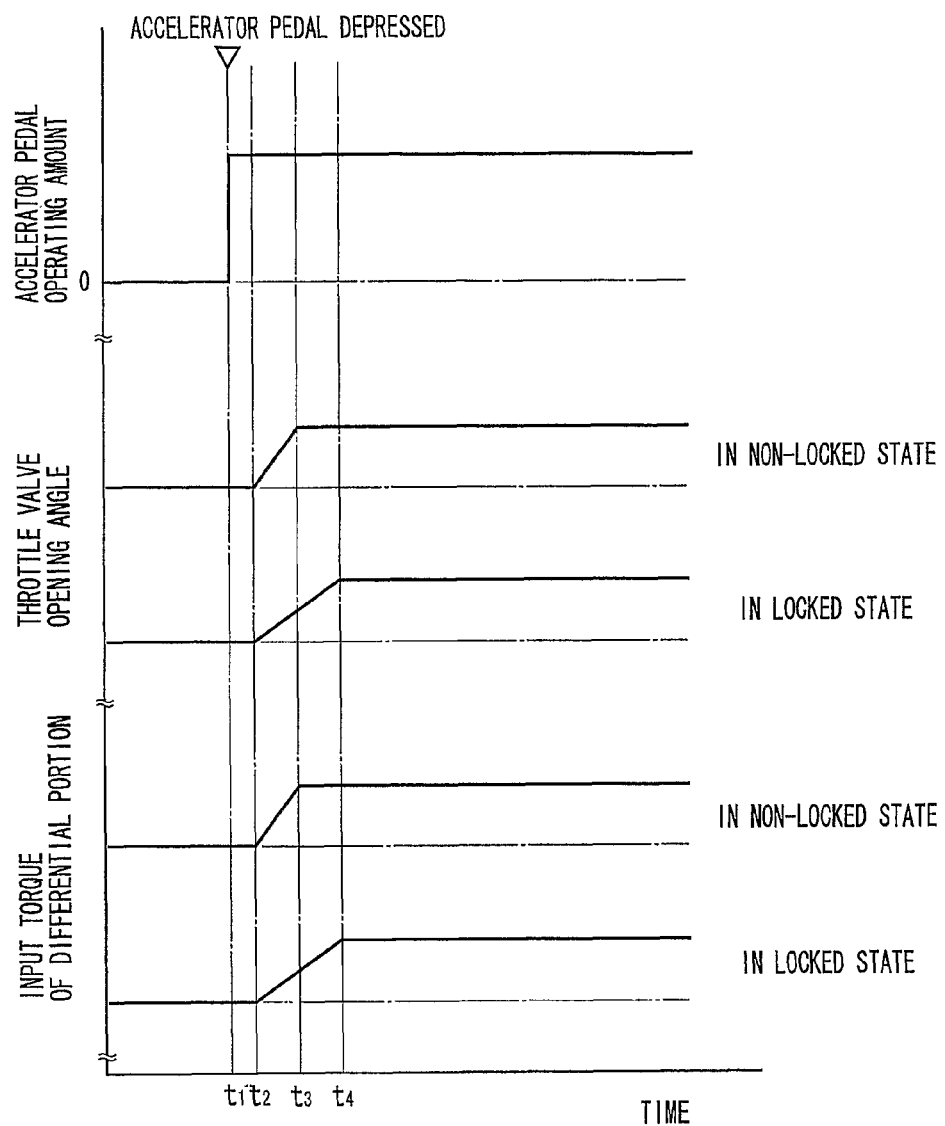
FIG. 12 is a time chart indicating the torque response control operation illustrated in the flow chart of FIG. 11, more particularly, control operations to smooth a change of the input torque of the differential portion when the differential portion is placed in a locked state and when the differential portion is placed in a non-locked state, where the accelerator pedal is depressed.

FIG. 12 is the time chart indicating the torque response control operations illustrated in the flow chart of FIG. 11, which are respectively performed to smooth the change of the input torque $T_{11}$ of the differential portion 11 when the differential portion 11 is placed in the locked and non-locked state, where the accelerator pedal 45 is depressed.

Figure 13:
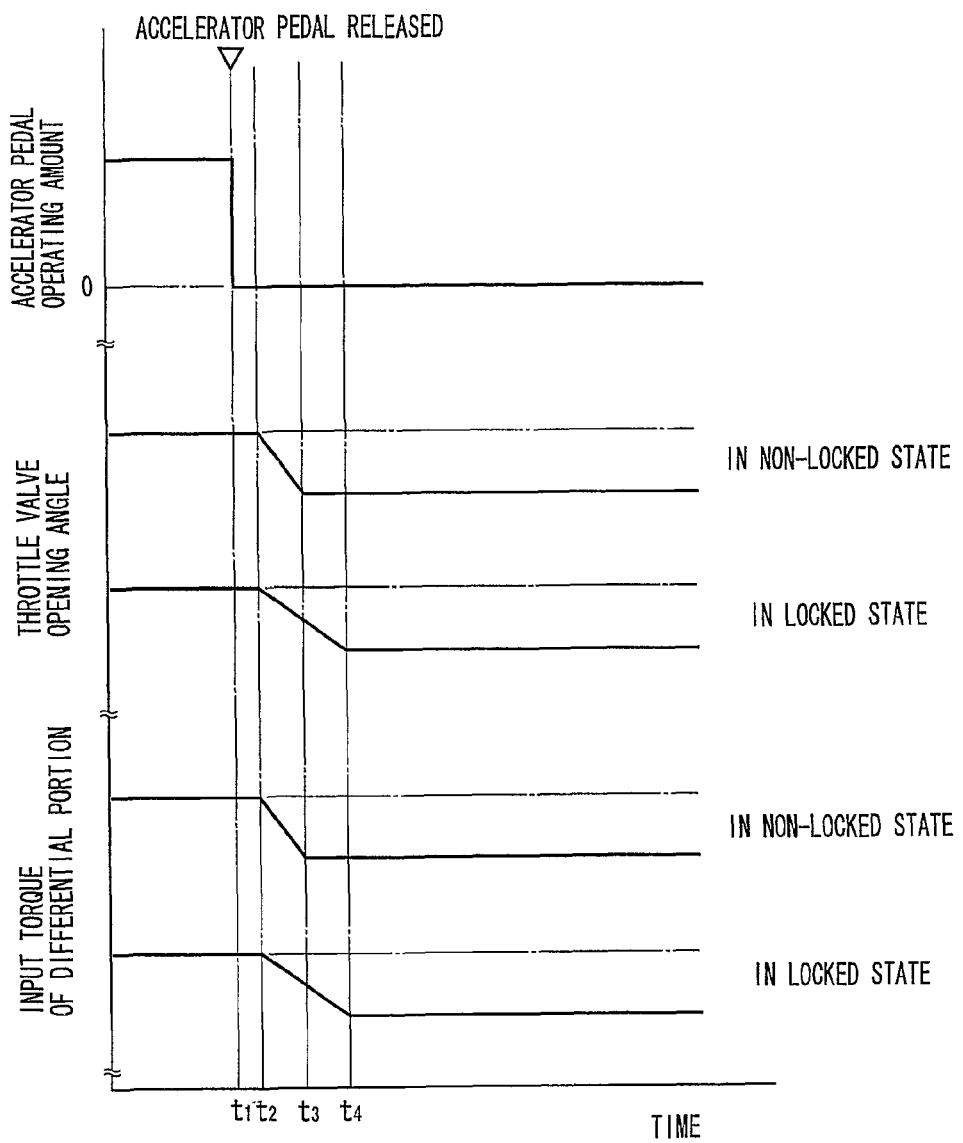
FIG. 13 is a time chart indicating the torque response control operation illustrated in the flow chart of FIG. 11, more particularly, control operations to smooth the change of the input torque of the differential portion when the differential portion is placed in the locked and non-locked state, where the accelerator pedal is released.

FIG. 13 is the time chart indicating the torque response control operations illustrated in the flow chart of FIG. 11, which are respectively performed to smooth the change of the input torque $T_{11}$ of the differential portion 11 when the differential portion 11 is placed in the locked and non-locked state, where the accelerator pedal 45 is released.

The torque response control routine of FIG. 11 is initiated with step S1 corresponding to the accelerator-operating-amount determining means 80, to determine whether the accelerator pedal 45 has been depressed or released. The determination as to whether the accelerator pedal 45 has been depressed is made by determining whether the amount of increase $\Delta A_{CC}$ (positive value of the amount of change $\Delta A_{CC}$) of the operating amount $A_{CC}$ of the accelerator pedal 45 is larger than the predetermined threshold $A_{CC}1$. The determination as to whether the accelerator pedal 45 has been released (operated toward the non-operated position) is made by determining whether the amount of decrease $\Delta A_{CC}$ (negative value of the amount of change $\Delta A_{CC}$) of the operating amount $A_{CC}$ of the accelerator pedal 45 is larger than the predetermined threshold $A_{CC}2$.

In the example of FIG. 12, the accelerator pedal 45 is depressed at a point of time t1.

In the example of FIG. 13, the accelerator pedal 45 is released (operated toward the non-operated position) at the point of time t1.

If a negative decision (NO) is obtained in the step S1, one cycle of execution of the routine is terminated. If an affirmative decision (YES) is obtained in the step S1, the control flow goes to step S2 to determine whether the power distributing mechanism 16 is placed in the differential state, that is, whether the differential portion 11 is placed in the continuously-variable shifting state. This determination is made by determining whether the vehicle condition is in the continuously-variable shifting region defined by the switching boundary line map of FIG. 6.

If a negative decision (NO) is obtained in the step S2, the control flow goes to step S3 corresponding to the torque-response control means 84, to determine the amount of smoothing of a change of the input torque $T_{11}$ of the differential portion 11 on the basis of the rate of change $A_{CC}'$ of the operating amount $A_{CC}$ of the accelerator pedal 45, and according to the relationship of FIG. 10A or 10B used when the differential portion 11 is placed in the locked state (step-variable shifting state). Namely, the torque-response control means 84 determines the amount of smoothing of a change of the engine torque $T_E$, and/or the output torque of the first electric motor M1 and/or the second electric motor M2 to be added to or subtracted from the engine torque $T_E$.

If an affirmative decision (YES) is obtained in the step S2, the control flow goes to step S4 also corresponding to the torque-response control means 84, to determine the amount of smoothing of a change of the input torque $T_{11}$ of the differential portion 11 on the basis of the rate of change $A_{CC}'$ of the operating amount $A_{CC}$ of the accelerator pedal 45, and according to the relationship of FIG. 10A or 10B used when the differential portion 11 is placed in the non-locked state (continuously-variable shifting state). Namely, the torque-response control means 84 determines the amount of smoothing of a change of the engine torque $T_E$.

The step S3 or S4 is followed by step S5 corresponding to the torque-response control means 84 and the hybrid control means 52, to command the hybrid control means 52 to control the rate of change of the angle of opening of the electronic throttle valve 96, for thereby adjusting the rate of change of the engine torque $T_E$. According to the command from the torque-response control means 84, the hybrid control means 52 commands the engine output control device 43 to control the electronic throttle valve 96 such that the angle of opening is increased at a rate determined by the determined amount of smoothing, to smooth a rise of the engine torque $T_E$ to be caused by the depressing or accelerating operation of the accelerator pedal 45 to accelerate the vehicle, or is reduced at a rate determined by the determined amount of smoothing, to smooth a fall of the engine torque $T_E$ to be caused by the releasing or decelerating operation of the accelerator pedal 45 to decelerate the vehicle.

When the differential portion 11 is placed in the locked state, the hybrid control means 52 may be commanded to adjust the output torque of the first electric motor M1 and/or the second electric motor M2, in place of or in addition to controlling the electronic throttle valve 96 to adjust the rate of change of the engine torque $T_E$. In this case, the hybrid control means 52 commands the inverter 58 to control the first electric motor M1 and/or the second electric motor M2 to generate the reverse drive torque by which the engine torque $T_E$ is reduced, to smooth the rise of the engine torque $T_E$ to be caused by the depressing operation of the accelerator pedal 45, or to generate the forward drive torque by which the engine torque $T_E$ is increased, to smooth the fall of the engine torque $T_E$ to be caused by the releasing operation of the accelerator pedal 45.

Where the accelerator pedal 45 is depressed to accelerate the vehicle, the hybrid control means 52 may be commanded to retard the ignition timing of the engine 8, in place of or in addition to controlling the electronic throttle valve 96 to adjust the rate of change of the engine torque $T_E$, for smoothing the rise of the engine torque $T_E$. In this case, the hybrid control means 52 controls the ignition device 98 to retard the ignition timing of the engine 8, so as to smooth the rise of the engine torque $T_E$ for obtaining the determined amount of smoothing of a rise of the input torque $T_{11}$.

When the accelerator pedal 45 is depressed while the differential portion 11 is placed in the non-locked state, the rise of the input torque $T_{11}$ of the differential portion 11 is smoothed during a time period between the points of time t2 and t3, as indicated in FIG. 12. In the locked-state of the differential portion 11, on the other hand, the rise of the input torque T11 is smoothed during a time period between the points of time t2 and t4, such that the input torque $T_{11}$ rises at a lower rate than in the non-locked state of the differential portion 11, as also indicated in FIG. 12. In the example of FIG. 12, the rise of the input torque $T_{11}$ of the differential portion 11 is smoothed by smoothing the rate of increase of the angle of opening of the electronic throttle valve 96 to smooth the rise of the engine speed $T_E$. In the non-locked state of the differential portion 11, however, the change of the input torque $T_{11}$ (change of the torque to be transmitted to the power transmitting member 18) may be smoothed by generation of the reverse drive torque generated by the first electric motor M1 and/or the second electric motor M2, in place of or in addition to the adjustment of the rate of increase of the angle of opening of the electronic throttle valve 96.

When the accelerator pedal 45 is released while the differential portion 11 is placed in the non-locked state, the fall of the input torque $T_{11}$ of the differential portion 11 is smoothed during a time period between the points of time t2 and t3, as indicated in FIG. 13. In the locked-state of the differential portion 11, on the other hand, the fall of the input torque T11 is smoothed during a time period between the points of time t2 and t4, such that the input torque $T_{11}$ falls at a lower rate than in the non-locked state of the differential portion 11, as also indicated in FIG. 13. In the example of FIG. 13, the fall of the input torque $T_{11}$ of the differential portion 11 is smoothed by smoothing the rate of decrease of the angle of opening of the electronic throttle valve 96 to smooth the fall of the engine torque $T_E$. In the non-locked state of the differential portion 11, however, the change of the input torque $T_{11}$ (change of the torque to be transmitted to the power transmitting member 18) may be smoothed by generation of the forward drive torque generated by the first electric motor M1 and/or the second electric motor M2, in place of or in addition to the adjustment of the rate of decrease of the angle of opening of the electronic throttle valve 96.

In the control device in the form of the electronic control device 40 according to the present embodiment of the invention, the switching control means 50 controls the differential limiting device in the form of the switching clutch C0 and the switching brake B0 for controlling differential function of the differential portion 11 as the electrically controlled differential device, such that the switching clutch C0 or the switching brake B0 is engaged to place the differential portion 11 in a selected one of the continuously-variable and step-variable shifting states. Accordingly, the vehicular drive system controlled by the electronic control device 40 has both an advantage of an improved fuel economy of a transmission the speed ratio of which is electrically controllable, and an advantage of a high power transmitting efficiency of a gear type power transmitting device capable of mechanically transmitting power from the engine 8 to the drive wheels 38.

For instance, the fuel economy of the vehicle is improved when the differential portion 11 is placed in its continuously-variable shifting state during a low-to-medium speed running or low-to-medium output running of the vehicle with the engine 8 placed in a normal output state. The fuel economy is also improved when the differential portion 11 is placed in its step-variable shifting state during a high-speed running of the vehicle, since the output of the engine 8 is primarily transmitted through a mechanical power transmitting path to the drive wheels 38, with reduction of a loss of conversion between mechanical and electric energies, which would take place in the transmission the speed ratio of which is electrically variable. When the differential portion 11 is placed in the step-variable shifting state during a high-output running of the vehicle, on the other hand, the vehicular drive system operates as the transmission the speed ratio of which is electrically variable, only at the low to medium running speed of the vehicle, so that the maximum electric energy that should be generated by the first electric motor M1 can be reduced, thereby making it possible to minimize the required sizes or capacities of the first electric motor M1, and the second electric motor M2 operated by the electric energy generated by the first electric motor M1, and the required size of the transmission mechanism 10 including these two electric motors M1, M2.

The electric control device 40 according to the present embodiment is further arranged such that the torque-response control means 84 controls the response of a change of the input torque $T_{11}$ of the differential portion 11 to an operation of the accelerator pedal 45, depending upon whether the differential function of the differential portion 11 is limited or not. Accordingly, the present electronic control device 40 reduces the amount of change of the input torque $T_{11}$ of the differential portion 11 placed in its non-differential state (step-variable shifting state or locked state), so that the amount of change of the drive torque to be transmitted to the drive wheels 38 is reduced, whereby the shock of the vehicular drive system to be caused by the depressing or releasing operation of the accelerator pedal 45 can be reduced.

For example, the torque-response control means 84 controls the response of the change of the input torque $T_{11}$ of the differential portion 11 to the operation of the accelerator pedal 45 such that the response is higher when the differential function of the differential portion 11 is not limited, than when the differential function is limited. In the differential state of the differential portion 11 in which the differential function is not limited, the amount of change of the engine torque $T_E$ due to the operation of the accelerator pedal 45 is reduced by the differential function of the differential portion 11, and the shock of the vehicular drive system to be caused by the operation of the accelerator pedal 45 is smaller than in the non-differential state in which the differential function is limited. Accordingly, the torque-response control means 84 arranged to assure a higher response of the change of the input torque $T_{11}$ of the differential portion 11 placed in the differential state permits a comparatively high rate of change of the drive torque to be transmitted to the drive wheels 38, according to the operation of the accelerator pedal 45, while the differential function of the differential portion 11 is not limited. In the non-differential state of the differential portion 11 in which the differential function is limited, the change of the input torque $T_{11}$ of the differential portion 11 is transmitted directly to the drive wheels 38, and the shock of the vehicular drive system to be caused by the operation of the accelerator pedal 45 is larger than in the differential state in which the differential function is not limited. Accordingly, the torque-response control means 84 is arranged to permit a lower response of the change of the input torque $T_{11}$ of the differential portion 11 placed in the non-differential state, causing a comparatively low rate of change of the drive torque to be transmitted to the drive wheels 38, so that the shock of the vehicular drive system to be caused by the operation of the accelerator pedal 45 in the non-differential state of the differential portion 11 is made almost equal to that in the differential state.

In the present embodiment, the torque-response control means 84 is arranged to reduce the response of the input torque T11 of the differential portion 11 to a depressing or accelerating operation of the accelerator pedal 45 to accelerate the vehicle or a releasing or decelerating operation of the accelerator pedal 45 to decelerate the vehicle, so that the amount of change of the drive torque to be transmitted to the drive wheels 38 is reduced, and the shock of the vehicular drive system due to the accelerating or decelerating operation of the accelerator pedal 45 is reduced.

The torque-response control means 84 of the present electronic control device 40 is further arranged to reduce the response of a change of the engine torque $T_E$ to the operation of the accelerator pedal 45 by smoothing the change of the engine torque $T_E$, for example, for thereby reducing the response of the change of the input torque $T_{11}$ of the differential portion 11 or smoothing the change of the input torque $T_{11}$. Thus, the rate of change of the engine torque $T_E$ is reduced, to reduce the rate of change of the input torque $T_{11}$ of the differential portion 11, so that the rate of change of the drive torque to be transmitted to the drive wheels 38 is reduced, whereby the shock of the vehicular drive system due to the accelerating or decelerating operation of the accelerator pedal 45 can be reduced.

The torque-response control means 84 of the present electronic control device 40 is further arranged to control the first electric motor M1 and/or the second electric motor M2 to generate a drive torque to be added to or subtracted from the engine torque $T_E$, so as to reduce the amount of change of the engine torque $T_E$ to be transmitted to the drive wheels 38, so that the response of the input torque $T_{11}$ of the differential portion 11 is reduced, or the change of the input torque $T_{11}$ is smoothed. Accordingly, the rate of change of the input torque T11 is reduced, and the rate of change of the drive torque to be transmitted to the drive wheels 38 is reduced, whereby the shock of the vehicular drive system due to the accelerating or decelerating operation of the accelerator pedal 45 can be reduced.

The other embodiments of the present invention will be described. In the following descriptions, the same reference as used in the preceding embodiment signs will be used to identify the corresponding elements.

Embodiment 2

Figures 14, 15:
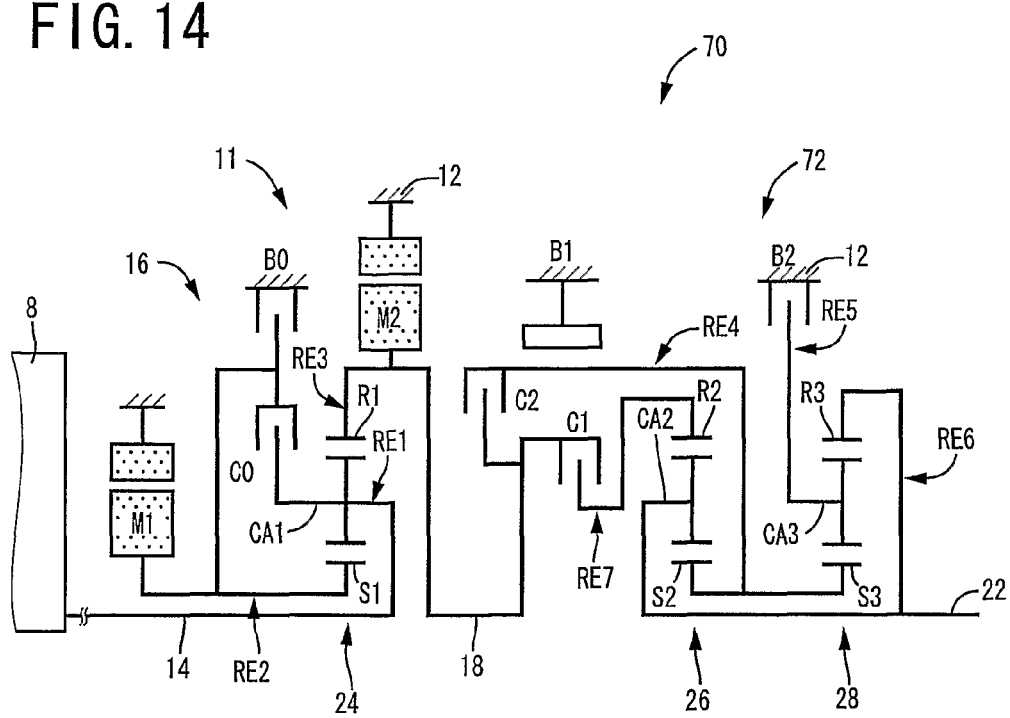
FIG. 14 is a schematic view corresponding to that of FIG. 1, showing an arrangement of another hybrid vehicle drive system to which the present invention is also applicable.
FIG. 15 is a table corresponding to that of FIG. 2, indicating shifting actions of the hybrid vehicle drive system of FIG. 14, which is operable in a selected one of the continuously-variable and step-variable shifting states, in relation to different combinations of operating states of hydraulically operated frictional coupling devices to effect the respective shifting actions.
Figure 16:
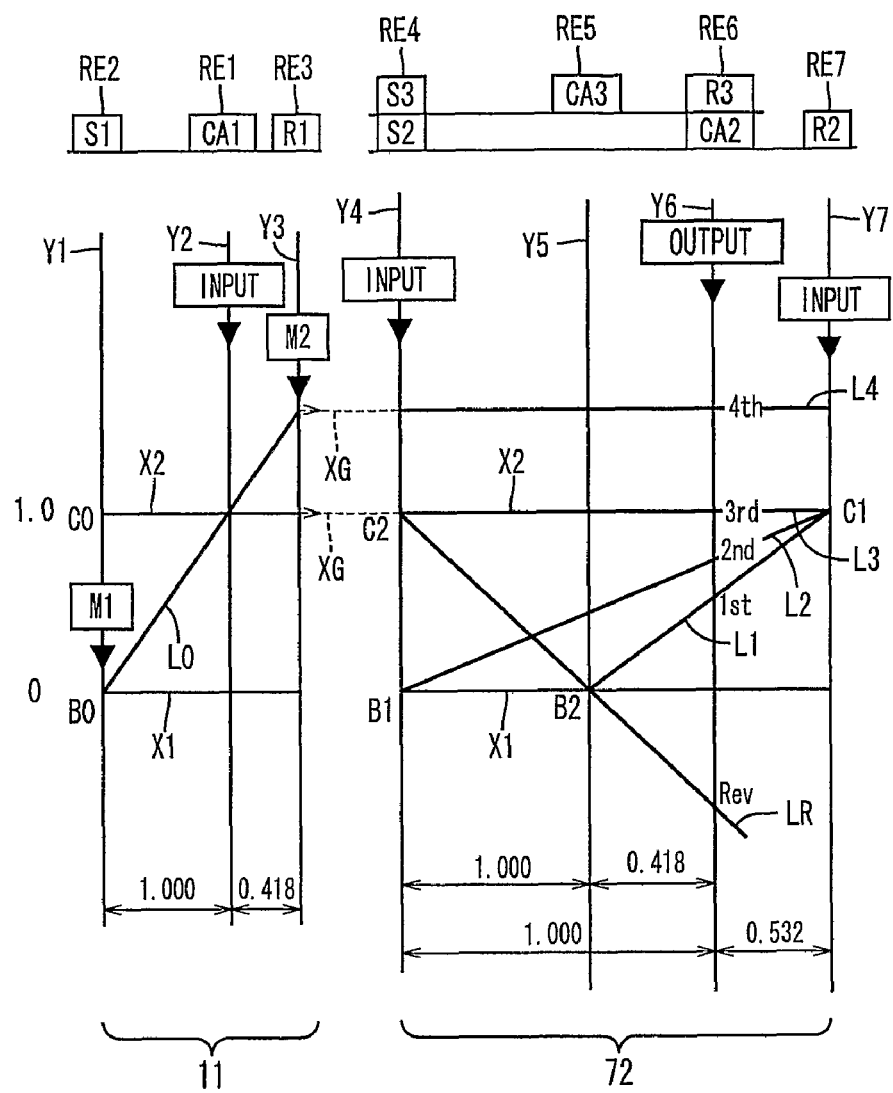
FIG. 16 is a collinear chart corresponding to that of FIG. 3, indicating relative rotating speeds of the rotary elements of the hybrid vehicle drive system of FIG. 14 in the step-variable shifting state, in the different gear positions.

Referring to the schematic view of FIG. 14, there is shown an arrangement of a transmission mechanism 70 in another embodiment of this invention, and FIG. 15 a table indicating a relationship between the gear positions of the transmission mechanism 70 and different combinations of engaged states of the hydraulically operated frictional coupling devices for respectively establishing those gear positions, while FIG. 16 is a collinear chart for explaining a shifting operation of the transmission mechanism 70.

The transmission mechanism 70 includes the differential portion 11 having the first electric motor M1, power distributing mechanism 16 and second electric motor M2, as in the preceding embodiment. The transmission mechanism 70 further includes an automatic transmission portion 72 having three forward drive positions. The automatic transmission portion 72 is disposed between the differential portion 11 and the output shaft 22 and is connected in series to the differential portion 11 and output shaft 22 through the power transmitting member 18. The power distributing mechanism 16 includes the single-pinion type first planetary gear set 24 having a gear ratio ρ1 of about 0.418, for example, and the switching clutch C0 and the switching brake B0. The automatic transmission portion 72 includes the single-pinion type second planetary gear set 26 having a gear ratio ρ2 of about 0.532, for example, and the single-pinion type third planetary gear set 28 having a gear ratio ρ3 of about 0.418, for example. The second sun gear S2 of the second planetary gear set 26 and the third sun gear S3 of the third planetary gear set 28 are integrally fixed to each other as a unit, selectively connected to the power transmitting member 18 through the second clutch C2, and selectively fixed to the casing 12 through the first brake B1. The second carrier CA2 of the second planetary gear set 26 and the third ring gear R3 of the third planetary gear set 28 are integrally fixed to each other and fixed to the output shaft 22. The second ring gear R2 is selectively connected to the power transmitting member 18 through the first clutch C1, and the third carrier CA3 is selectively fixed to the casing 12 through the second brake B2.

In the transmission mechanism 70 constructed as described above, one of a first gear position (first speed position) through a fourth gear position (fourth speed position), a reverse gear position (rear-drive position) and a neural position is selectively established by engaging actions of a corresponding combination of the frictional coupling devices selected from the above-described switching clutch C0, first clutch C1, second clutch C2, switching brake B0, first brake B1 and second brake B2, as indicated in the table of FIG. 15. Those gear positions have respective speed ratios γ (input shaft speed $N_{IN}$/output shaft speed $N_{OUT}$) which change as geometric series. In particular, it is noted that the power distributing mechanism 16 provided with the switching clutch C0 and brake B0 can be selectively placed by engagement of the switching clutch C0 or switching brake B0, in the fixed-speed-ratio shifting state in which the mechanism 16 is operable as a transmission having fixed speed ratio or ratios, as well as in the continuously-variable shifting state in which the mechanism 16 is operable as the continuously variable transmission described above. In the present transmission mechanism 70, therefore, a step-variable transmission is constituted by the transmission portion 72, and the differential portion 11 which is placed in the fixed-speed-ratio shifting state by engagement of the switching clutch C0 or switching brake B0. Further, a continuously variable transmission is constituted by the transmission portion 72, and the differential portion 11 which is placed in the continuously-variable shifting state, with none of the switching clutch C0 and brake B0 being engaged. In other words, the transmission mechanism 70 is switched to the step-variable shifting state, by engaging one of the switching clutch C0 and switching brake B0, and to the continuously-variable shifting state by releasing both of the switching clutch C0 and switching brake B0.

Where the transmission mechanism 70 functions as the step-variable transmission, for example, the first gear position having the highest speed ratio γ1 of about 2.804, for example, is established by engaging actions of the switching clutch C0, first clutch C1 and second brake B2, and the second gear position having the speed ratio γ2 of about 1.531, for example, which is lower than the speed ratio γ1, is established by engaging actions of the switching clutch C0, first clutch C1 and first brake B1, as indicated in FIG. 15. Further, the third gear position having the speed ratio γ3 of about 1.000, for example, which is lower than the speed ratio γ2, is established by engaging actions of the switching clutch C0, first clutch C1 and second clutch C2, and the fourth gear position having the speed ratio γ4 of about 0.705, for example, which is lower than the speed ratio γ3, is established by engaging actions of the first clutch C1, second clutch C2, and switching brake B0. Further, the reverse gear position having the speed ratio γR of about 2.393, for example, which is intermediate between the speed ratios γ1 and γ2, is established by engaging actions of the second clutch C2 and the second brake B2. The neutral position N is established by engaging only the switching clutch C0.

When the transmission mechanism 70 functions as the continuously-variable transmission, on the other hand, the switching clutch C0 and the switching brake B0 are both released, so that the differential portion 11 functions as the continuously variable transmission, while the automatic transmission portion 72 connected in series to the differential portion 11 functions as the step-variable transmission, whereby the speed of the rotary motion transmitted to the automatic transmission portion 72 placed in one of the first through third gear positions, namely, the rotating speed of the power transmitting member 18 is continuously changed, so that the speed ratio of the transmission mechanism 70 when the automatic transmission portion 72 is placed in one of those gear positions is continuously variable over a predetermined range. Accordingly, the total speed ratio of the automatic transmission portion 72 is continuously variable across the adjacent gear positions, whereby the overall speed ratio γT of the transmission mechanism 70 a whole is continuously variable.

The collinear chart of FIG. 16 indicates, by straight lines, a relationship among the rotating speeds of the rotary elements in each of the gear positions of the transmission mechanism 70, which is constituted by the differential portion 11 functioning as the continuously-variable shifting portion or first shifting portion, and the automatic transmission portion 72 functioning as the step-variable shifting portion or second shifting portion. The collinear chart of FIG. 16 indicates the rotating speeds of the individual elements of the differential portion 11 when the switching clutch C0 and brake B0 are both released, and the rotating speeds of those elements when the switching clutch C0 or brake B0 is engaged, as in the preceding embodiment In FIG. 16, four vertical lines Y4, Y5, Y6 and Y7 corresponding to the automatic transmission portion 72 and arranged in the rightward direction respectively represent the relative rotating speeds of a fourth rotary element (fourth element) RE4 in the form of the second and third sun gears S2, S3 integrally fixed to each other, a fifth rotary element (fifth element) RE5 in the form of the third carrier CA3, a sixth rotary element (sixth element) RE6 in the form of the second carrier CA2 and third ring gear R3 that are integrally fixed to each other, and a seventh rotary element (seventh element) RE7 in the form of the second ring gear R2. In the automatic transmission portion 72, the fourth rotary element RE4 is selectively connected to the power transmitting member 18 through the second clutch C2, and is selectively fixed to the casing 12 through the first brake B1, and the fifth rotary element RE5 is selectively fixed to the casing 12 through the second brake B2. The sixth rotary element RE6 is fixed to the output shaft 22 of the automatic transmission portion 72, and the seventh rotary element RE7 is selectively connected to the power transmitting member 18 through the first clutch C1.

When the first clutch C1 and the second brake B2 are engaged, the automatic transmission portion 72 is placed in the first gear position. The rotating speed of the output shaft 22 in the first gear position is represented by a point of intersection between the vertical line Y6 indicative of the rotating speed of the sixth rotary element RE6 fixed to the output shaft 22 and an inclined straight line L1 which passes a point of intersection between the vertical line Y7 indicative of the rotating speed of the seventh rotary element RE7 (R2) and the horizontal line X2, and a point of intersection between the vertical line Y5 indicative of the rotating speed of the fifth rotary element RE5 (CA3) and the horizontal line X1, as indicated in FIG. 16. Similarly, the rotating speed of the output shaft 22 in the second gear position established by the engaging actions of the first clutch C1 and first brake B1 is represented by a point of intersection between an inclined straight line L2 determined by those engaging actions and the vertical line Y6 indicative of the rotating speed of the sixth rotary element RE6 (CA2, R3) fixed to the output shaft 22. The rotating speed of the output shaft 22 in the third speed position established by the engaging actions of the first clutch C1 and second clutch C2 is represented by a point of intersection between an inclined straight line L3 determined by those engaging actions and the vertical line Y6 indicative of the rotating speed of the sixth rotary element RE6 fixed to the output shaft 22. In the first through third gear positions in which the switching clutch C0 is placed in the engaged state, the seventh rotary element RE7 is rotated at the same speed as the engine speed $N_E$, with the drive force received from the differential portion 11. When the switching brake B0 is engaged in place of the switching clutch C0, the sixth rotary element RE6 is rotated at a speed higher than the engine speed $N_E$, with the drive force received from the differential portion 11. The rotating speed of the output shaft 22 in the fourth gear position established by the engaging actions of the first clutch C1, second clutch C2 and switching brake B0 is represented by a point of intersection between a horizontal line L4 determined by those engaging actions and the vertical line Y6 indicative of the rotating speed of the sixth rotary element RE6 fixed to the output shaft 22.

The transmission mechanism 70 according to the present embodiment is also constituted by the differential portion 11 functioning as the continuously-variable shifting portion or first shifting portion, and the automatic transmission portion 72 functioning as the step-variable (automatic) shifting portion or second shifting portion, so that the present transmission mechanism 70 has advantages similar to those of the first embodiment.

Embodiment 3

Figure 17:
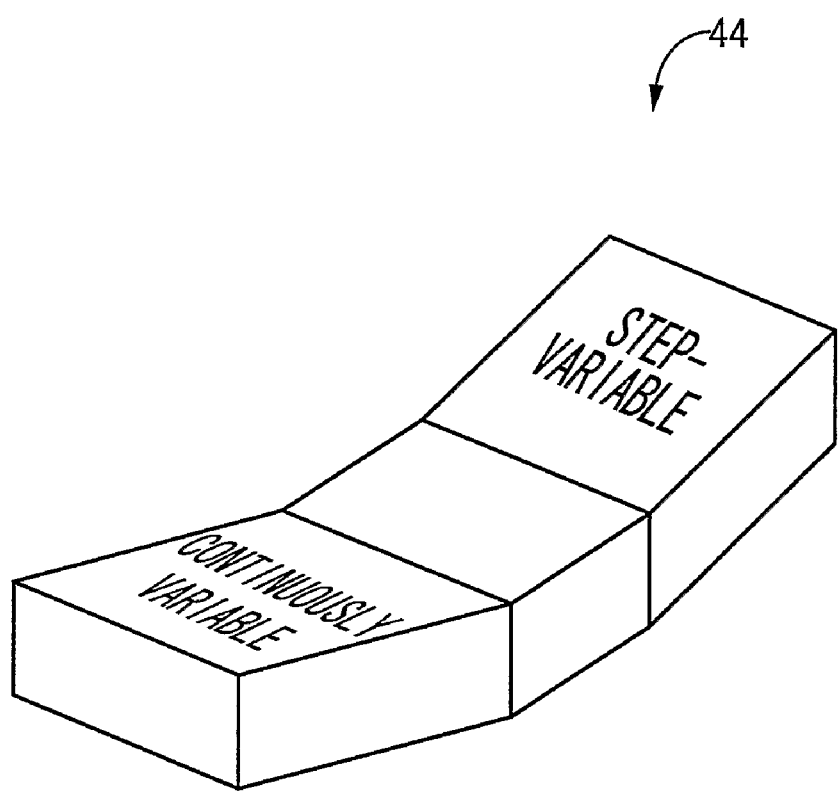
FIG. 17 is a perspective view showing an example of a manually operable shifting-state selecting device in the form of a seesaw switch operated by a user to select the shifting state.

FIG. 17 shows a seesaw switch 44 (hereinafter referred to as "switch 44") functioning as a shifting-state selecting device manually operable to select the differential state (non-locked state) and or non-differential state (locked state) of the power distributing mechanism 16, that is, to select the continuously-variable shifting state or step-variable shifting state of the transmission mechanism 10. This switch 44 permits the user to select the desired shifting state during running of the vehicle. The seesaw switch 44 has a continuously-variable-shifting running button labeled "CONTINUOUSLY-VARIABLE" for running of the vehicle in the continuously-variable shifting state, and a step-variable-shifting running button labeled "STEP-VARIABLE" for running of the vehicle in the step-variable shifting state, as shown in FIG. 22. When the continuously-variable-shifting running button is depressed by the user, the switch 44 is placed in a continuously-variable shifting position for selecting the continuously-variable shifting state in which the transmission mechanism 10 is operable as the electrically controlled continuously variable transmission. When the step-variable-shifting running button is depressed by the user, the switch 44 is placed in a step-variable shifting position for selecting in the step-variable shifting state in which the transmission mechanism is operable as the step-variable transmission.

In the preceding embodiments, the shifting state of the transmission mechanism 10 is automatically switched on the basis of the vehicle condition and according to the switching boundary line map shown in FIG. 6 by way of example. However, the shifting state of the transmission mechanism 10, 70 may be switched by a manual operation of the seesaw switch 44, in place of or in addition to the automatic switching operation. Namely, the switching control means 50 may be arranged to selectively place the transmission mechanism 10 in the continuously-variable shifting state or the step-variable shifting state, depending upon whether the switch 44 is placed in its continuously-variable shifting position or step-variable shifting position. For instance, the user manually operates the switch 44 to place the transmission mechanism 10 in the continuously-variable shifting state when the user likes the transmission mechanism 10 to operate as a continuously variable transmission or wants to improve the fuel economy of the engine, or alternatively in the step-variable shifting state when the user likes a rhythmical change of the engine speed as a result of a shifting action of the step-variable transmission.

The switch 44 may have a neutral position in which none of the continuously-variable and step-variable shifting states are selected. In this case, the switch 44 may be placed in its neutral position when the user has not selected the desired shifting state or likes the transmission mechanism 10 to be automatically placed in one of the continuously-variable and step-variable shifting states.

Where the shifting state of the transmission mechanism 10 is not automatically selected, but is manually selected by a manual operation of the switch 44, step S2 in the flow chart of FIG. 11 is formulated such that the determination as to whether the power distributing mechanism 16 is placed in the differential state, that is, whether the differential portion 11 is placed in the continuously-variable shifting state, is effected depending upon whether the switch 44 has been operated to select the differential state of the power distributing mechanism 16 or the continuously-variable shifting state of the transmission mechanism 10.

While the preferred embodiments of this invention have been described in detail by reference to the accompanying drawings, it is to be understood that the present invention may be otherwise embodied.

In the preceding embodiments, the differential-state determining means 82 (step S2 of FIG. 11) is arranged to determine whether the power distributing mechanism 16 is placed in the differential state or not, by determining whether the vehicle condition is in the continuously-variable shifting region defined by the switching boundary line map indicated in FIG. 6 by way of example. However, the determination by the differential-state determining means 82 as to whether the power distributing mechanism 16 is placed in the differential state or not may be based on the determination by the switching control means 50 as to whether the transmission mechanism 10 is placed in the continuously-variable shifting region or the step-variable shifting region.

In the preceding embodiment, the first electric motor M1 and/or the second electric motor M2 is/are used to generate a drive torque to be added to or subtracted to the engine torque $T_E$, to reduce the amount of change of the engine torque $T_E$ due to be caused by the depressing or releasing operation of the accelerator pedal 45, for thereby controlling the response of the input torque $T_{11}$ of the differential portion 11 under the control of the torque-response control means 84. However, a third electric motor M3 operatively connectable to the engine 8 may be used to generate the drive torque to reduce the amount of change of the engine torque $T_E$ due to the depressing or releasing operation of the accelerator pedal 45, for controlling the response of the input torque $T_{11}$ of the differential portion 11. In this case, the input torque $T_{11}$ can be controlled by the drive torque generated by the third electric motor M3 to reduce the amount of change of the engine torque $T_E$, even while the differential portion 11 is placed in the continuously-variable shifting state (differential state). The third electric motor M3 may be an engine starter motor.

In the preceding embodiments, the amount of smoothing of a change of the input torque $T_{11}$ of the differential portion 11 is determined by the torque-response control means 84, on the basis of the relationships (maps) of FIGS. 10A and 10B between the rate of change $A_{CC}{'}$ of the operating amount $A_{CC}$ of the accelerator pedal 45 and the amount of smoothing of the change of the input torque $T_{11}$. However, those relationships or maps may be replaced by relationships between the rate of change $A_{CC}{'}$ and a coefficient which determines the amount of smoothing of the change of the input torque $T_{11}$. Further, the rate of change $A_{CC}{'}$ of the operating amount $A_{CC}$ of the accelerator pedal 45 may be replaced by a rate of change of the engine torque $T_E$ or a rate of change of the angle of opening $\theta_{TH}$ of the electronic throttle valve 96.

In the illustrated embodiments, the transmission mechanism 10, 70 is switchable between its continuously-variable shifting state and the step-variable shifting states by placing the differential portion 11 (power distributing mechanism 16) selectively in one of its differential state in which the differential portion is operable as the electrically controlled continuously variable transmission, and the non-differential state (locked state) in which the differential portion 11 is not operable as the continuously-variable transmission. However, the differential portion 11 placed in its differential state can be operable as the step-variable transmission the speed ratio of which is variable in steps rather than continuously. In other words, the differential and non-differential states of the differential portion 11 do not respectively correspond to the continuously-variable and step-variable shifting states of the transmission mechanism 10, 70, and therefore the differential portion 11 need not be switchable between the continuously-variable and step-variable shifting states. The principle of this invention is applicable to any transmission mechanism which is switchable between the differential and non-differential states, or wherein the differential portion 11 (power distributing mechanism 16) is switchable between the differential and non-differential states.

In the power distributing mechanism 16 in the illustrated embodiments, the first carrier CA1 is fixed to the engine 8, and the first sun gear S1 is fixed to the first electric motor M1 while the first ring gear R1 is fixed to the power transmitting member 18. However, this arrangement is not essential. The engine 8, first electric motor M1 and power transmitting member 18 may be fixed to any other elements selected from the three elements CA1, S1 and R1 of the first planetary gear set 24.

While the engine 8 is directly fixed to the input shaft 14 in the illustrated embodiments, the engine 8 may be operatively connected to the input shaft 14 through any suitable member such as gears and a belt, and need not be disposed coaxially with the input shaft 14.

In the illustrated embodiments, the first electric motor M1 and the second electric motor M2 are disposed coaxially with the input shaft 14, and are fixed to the first sun gear S1 and the power transmitting member 18, respectively. However, this arrangement is not essential. For example, the first and second electric motors M1, M2 may be operatively connected to the first sun gear S1 and the power transmitting member 18, respectively, through gears or belts. Further, the second electric motor M2 connected to the power transmitting member 18 in the illustrated embodiment may be connected to the output shaft 22 or any of the rotary elements of the automatic transmission portion 20, 72. The second electric motor M2 connected to the power transmitting member 18 or output shaft 22 may be considered to be disposed in a power transmitting path between the power transmitting member 18 and the drive wheels 38.

Although the power distributing mechanism 16 in the illustrated embodiments is provided with the switching clutch C0 and the switching brake B0, the power distributing mechanism 16 need not be provided with both of the switching clutch C0 and brake B0. While the switching clutch C0 is provided to selectively connect the first sun gear S1 and the first carrier CA1 to each other, the switching clutch C0 may be provided to selectively connect the first sun gear S1 and the first ring gear R1 to each other, or selectively connect the first carrier CA1 and the first ring gear R1. Namely, the switching clutch C0 may be arranged to connect any two elements of the three elements of the first planetary gear set 24.

While the switching clutch C0 is engaged to establish the neutral position N in the transmission mechanism 10, 70 in the illustrated embodiments, the switching clutch C0 need not be engaged to establish the neutral position.

The hydraulically operated frictional coupling devices used as the switching clutch C0, switching brake B0, etc. in the illustrated embodiments may be replaced by a coupling device of a magnetic-power type, an electromagnetic type or a mechanical type, such as a powder clutch (magnetic powder clutch), an electromagnetic clutch and a meshing type dog clutch.

In the illustrated embodiments, the automatic transmission portion 20, 72 is disposed in the power transmitting path between the drive wheels 38, and the power transmitting member 18 which is the output member of the differential portion 11 or power distributing mechanism 16. However, the automatic transmission portion 20, 72 may be replaced by any other type of power transmitting device such as: a continuously variable transmission (CVT) which is a kind of an automatic transmission; and an automatic transmission which is a permanent-mesh parallel-two-axes type transmission well known as a manual transmission and which is automatically shifted by select cylinders and shift cylinders. Where the continuously variable transmission (CVT) is provided, the transmission mechanism as a whole is placed in the step-variable shifting state when the power distributing mechanism 16 is placed in the fixed-speed-ratio shifting state. The step-variable shifting state is defined as a state in which power is transmitted primarily through a mechanical power transmitting path, without power transmission through an electric path. The continuously variable transmission may be arranged to establish a plurality of predetermined fixed speed ratios corresponding to those of the gear positions of a step-variable transmission, according to stored data indicative of the predetermined speed ratios. The principle of the present invention is applicable to a vehicular drive system which does not include the automatic transmission portion 10, 72.

While the automatic transmission portion 20, 72 in the preceding embodiments is connected in series to the differential portion 11 through the power transmitting member 18, the automatic transmission portion 20, 72 may be mounted on and disposed coaxially with a counter shaft which is parallel to the input shaft 14. In this case, the differential portion 11 and the automatic transmission portion 20, 72 are operatively connected to each other through a suitable power transmitting device or a set of two power transmitting members such as a pair of counter gears, and a combination of a sprocket wheel and a chain.

The power distributing mechanism 16 provided as a differential mechanism in the preceding embodiments may be replaced by a differential gear device including a pinion rotated by the engine 8, and a pair of bevel gears which are respectively operatively connected to the first and second electric motors M1, M2.

While the power distributing mechanism 16 in the illustrated embodiments is constituted by one planetary gear set 24, it may be constituted by two or more planetary gear sets so that the power distributing mechanism 16 is operable as a transmission having three or more gear positions in the non-differential state (fixed-speed-ratio shifting state). Each planetary gear set of the power distributing mechanism need not be a single-pinion type, but may be a double-pinion type.

While the switch 44 is of a seesaw type switch in the preceding embodiments, the seesaw switch 44 may be replaced by a single pushbutton switch, two pushbutton switches that are selectively pressed into operated positions, a lever type switch, a slide-type switch or any other type of switch or switching device that is operable to select a desired one of the continuously-variable shifting state (differential state) and the step-variable shifting state (non-differential state). The seesaw switch 44 may or may not have a neutral position. Where the seesaw switch 44 does not have the neutral position, an additional switch may be provided to enable and disable the seesaw switch 44. The function of this additional switch corresponds to the neutral position of the seesaw switch 44. The seesaw switch 44 may be replaced by a switching device operable by a voice generated by the vehicle operator or a foot of the vehicle operator, rather than by hand, to select one of the continuously-variable shifting state (differential state) and the step-variable shifting state (non-differential state).

It is to be understood that the embodiments of the invention have been descried for illustrative purpose only, and that the present invention may be embodied with various changes and modifications which may occur to those skilled in the art.

The invention claimed is:

1. A control device for a vehicular drive system including a differential portion having a differential mechanism operable to distribute an output of an engine to a first electric motor and a power transmitting member, and a second electric motor disposed in a power transmitting path between the power transmitting member and a drive wheel of a vehicle, said control device comprising:
    a differential limiting device provided in said differential mechanism and operable to limit a differential function of said differential mechanism for thereby limiting a differential function of said differential portion; and
    a torque-response control portion that controls a response of a change of a torque to an operation of a manually operable vehicle accelerating member, the torque being an input torque of said differential portion, the input torque changing according to the operation of the manually operable vehicle accelerating member, and the torque-response control portion controlling the response of the change of the input torque depending upon whether the differential function of said differential mechanism is limited or not.

2. The control device according to claim 1, wherein said differential portion is a continuously-variable transmission portion operable as an electrically controlled continuously variable transmission.

3. The control device according to claim 1, wherein said torque-response control portion is operable to control the response of the change of the input torque of said differential portion to the operation of said manually operable vehicle accelerating member, such that said response is greater when the differential function of said differential mechanism is not limited, than when the differential function of said differential mechanism is limited.

4. The control device according to claim 1, wherein said torque-response control portion is operable to reduce a response of a change of a torque of said engine to the operation of said manually operable vehicle accelerating member, for thereby reducing the response of the change of the input torque of said differential portion.

5. The control device according to claim 1, wherein said torque-response control portion is operable to control at least one of said first electric motor and said second electric motor to generate a drive torque to be added to or subtracted from a torque of said engine, for thereby reducing the response of the change of the input torque of said differential portion.

6. The control device according to claim 1, wherein said differential limiting device is operable to place said differential mechanism in a differential state in which the differential function is available, for thereby placing said differential portion in a differential state in which the differential function is available, and
    wherein said differential limiting device is operable to place said differential mechanism in a non-differential state in which the differential function is limited, for thereby placing said differential portion in a non-differential state in which the differential function is limited.

7. The control device according to claim 2, wherein said differential limiting device is operable to place said differential mechanism in a differential state in which the differential function is available, for thereby placing said continuously-variable transmission portion in a continuously-variable shifting state in which said continuously-variable transmission portion is operable as said electrically controlled continuously variable transmission, and wherein said differential limiting device is operable to place said differential mechanism in a non-differential state in which the differential function is limited, for thereby placing said continuously-variable transmission portion in a step-variable shifting state in which the function of said continuously-variable transmission portion as said electrically controlled continuously variable transmission is limited.

8. The control device according to claim 1, wherein said differential mechanism includes a first element connected to said engine, a second element connected to said first electric motor, and a third element connected to said power transmitting member, wherein said differential limiting device is operable to place said differential mechanism in a differential state in which said first, second and third elements of said differential mechanism are rotatable relative to each other, and wherein said differential limiting device is operable to place the differential mechanism in a non-differential state in which at least said second and third elements are not rotatable relative to each other.

9. The control device according to claim 8, wherein said differential limiting device includes a clutch operable to connect any two of said first, second, and third elements of said differential mechanism to each other for rotating the first, second, and third elements as a unit, and/or a brake operable to fix the second element to a stationary member for holding said second element stationary.

10. The control device according to claim 9, wherein said differential limiting device includes both of said clutch and brake, and said clutch and brake are released to place said differential mechanism in said differential state in which at least said second and third elements are rotatable at respective different speeds, and in which the differential mechanism is operable as an electrically controlled differential device, said clutch being engaged to permit said differential mechanism to be operable as a transmission having a speed ratio of 1, or said brake being engaged to permit the differential mechanism to be operable as a speed-increasing transmission having a speed ratio lower than 1.

11. The control device according to claim 8, wherein said differential mechanism is a planetary gear set said first element being a carrier of the planetary gear set, said second element being a sun gear of the planetary gear set, and said third element being a ring gear of the planetary gear set.

12. The control device according to claim 11, wherein said planetary gear set is of a single-pinion type.

13. The control device according to claim 1, wherein said vehicular drive system further includes an automatic transmission portion disposed in said power transmitting path, and an overall speed ratio of the vehicular drive system is defined by a speed ratio of said differential portion and a speed ratio of said automatic transmission portion.

14. The control device according to claim 13, wherein said automatic transmission portion is a step-variable automatic transmission portion.

15. The control device according to claim 1, further comprising switching control means operable to control said differential limiting device on a basis of a predetermined condition of the vehicle, for placing said differential mechanism selectively in one of a differential state in which the differential function is available, and a non-differential state in which the differential function is limited.

16. The control device according to claim 15, wherein said predetermined condition of the vehicle is determined on a basis of a predetermined upper limit value of a running speed of the vehicle, and wherein said switching control means controls said differential limiting device to place said differential mechanism in said non-differential state when an actual value of the running speed of the vehicle is greater than said predetermined upper limit value.

17. The control device according to claim 15, wherein said predetermined condition of the vehicle is determined on a basis of a predetermined upper limit value of a drive-force-related value of the vehicle, and wherein said switching control means controls said differential limiting device to place said differential mechanism in said non-differential state when said drive-force-related value of the vehicle is greater than said predetermined upper limit value.

18. The control device according to claim 15, wherein said predetermined condition of the vehicle is determined on a basis of an actual value of a running speed of the vehicle and an actual value of a drive-force-related value of the vehicle and according to a stored switching boundary line map including a high-speed-running boundary line and a high-output-running boundary line which are defined by parameters in of said running speed of the vehicle and said drive-force-related value.

19. The control device according to claim 15, wherein said predetermined condition of the vehicle is a functional-deterioration determining condition which is satisfied when a function of any one of control components for enabling said differential portion to operate as an electrically controlled differential device is deteriorated, and wherein said switching control means controls said differential limiting device to place said differential mechanism in said non-differential state when said functional-deterioration determining condition is satisfied.

* * * * *